US009598785B2

(12) United States Patent
Patolsky et al.

(10) Patent No.: US 9,598,785 B2
(45) Date of Patent: Mar. 21, 2017

(54) NANOSTRUCTURES AND PROCESS OF PREPARING SAME

(75) Inventors: Fernando Patolsky, Rechovot (IL); Roey Elnathan, Jerusalem (IL); Raisa Kantaev, Ashdod (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 1219 days.

(21) Appl. No.: 13/063,205

(22) PCT Filed: Sep. 10, 2009

(86) PCT No.: PCT/IL2009/000887
§ 371 (c)(1),
(2), (4) Date: Mar. 10, 2011

(87) PCT Pub. No.: WO2010/029550
PCT Pub. Date: Mar. 18, 2010

(65) Prior Publication Data
US 2011/0171137 A1    Jul. 14, 2011

Related U.S. Application Data

(60) Provisional application No. 61/136,515, filed on Sep. 11, 2008.

(51) Int. Cl.
| A61B 5/055 | (2006.01) |
| C25D 1/00 | (2006.01) |
| B82Y 15/00 | (2011.01) |
| B82Y 30/00 | (2011.01) |
| C25D 5/10 | (2006.01) |
| C25D 5/18 | (2006.01) |
| C25D 13/04 | (2006.01) |
| C25D 11/04 | (2006.01) |

(52) U.S. Cl.
CPC ............. *C25D 1/006* (2013.01); *B82Y 15/00* (2013.01); *B82Y 30/00* (2013.01); *C25D 5/10* (2013.01); *C25D 5/18* (2013.01); *C25D 13/04* (2013.01); *B01J 2219/005* (2013.01); *B01J 2219/00504* (2013.01); *B01J 2219/00547* (2013.01); *C25D 11/04* (2013.01); *Y10T 29/49826* (2015.01); *Y10T 428/10* (2015.01); *Y10T 428/12493* (2015.01); *Y10T 428/12528* (2015.01); *Y10T 428/12542* (2015.01); *Y10T 428/12556* (2015.01); *Y10T 428/12826* (2015.01); *Y10T 428/12868* (2015.01); *Y10T 428/12889* (2015.01); *Y10T 428/298* (2015.01); *Y10T 428/2913* (2015.01)

(58) Field of Classification Search
CPC . A61K 9/14; A61K 9/143; A61K 9/51; A61K 49/00; A61K 49/0002; A61K 49/0013; A61K 49/0021; A61K 49/0063; A61K 49/0067; A61K 49/5115
USPC ........................................................ 424/489
See application file for complete search history.

(56) References Cited

U.S. PATENT DOCUMENTS

| 6,884,478 | B2* | 4/2005 | Alivisatos | ............... C09K 19/02 136/252 |
| 2002/0115747 | A1* | 8/2002 | Feldheim | ................. B01J 13/14 523/201 |
| 2004/0023428 | A1 | 2/2004 | Gole et al. | |
| 2004/0203256 | A1 | 10/2004 | Yang et al. | |
| 2004/0209376 | A1* | 10/2004 | Natan | .................. B01J 13/0047 436/56 |
| 2005/0054004 | A1* | 3/2005 | Alivisatos | .............. B82Y 15/00 435/7.1 |
| 2006/0054506 | A1* | 3/2006 | Natan et al. | ................... 205/112 |
| 2006/0131695 | A1* | 6/2006 | Kuekes | .................. B82Y 30/00 257/618 |
| 2007/0001581 | A1* | 1/2007 | Stasiak | .................. B82Y 20/00 313/498 |
| 2007/0077429 | A1 | 4/2007 | Mirkin et al. | |
| 2007/0121375 | A1 | 5/2007 | Sewell | |
| 2008/0149178 | A1* | 6/2008 | Reyes-Reyes et al. | ........ 136/263 |
| 2008/0206891 | A1* | 8/2008 | Wang et al. | .................. 436/526 |

FOREIGN PATENT DOCUMENTS

| WO | WO 2005/002643 | 1/2005 |
| WO | WO 2006/070095 | 7/2006 |
| WO | WO 2009/029859 | 3/2009 |
| WO | WO 2010/029550 | 3/2010 |

OTHER PUBLICATIONS

International Preliminary Report on Patentability Dated Mar. 24, 2011 From the International Bureau of WIPO RE.: Application No. PCT/FL2009/00887.
International Search Report and the Written Opinion Dated Apr. 22, 2010 From the International Searching Authority Re.: Application No. PCT/IL2009/000887.
Gao et al. "Metal/Semiconductor Core/Shell Nanodisks and Nanotubes", Advanced Functional Materials, XP001238713, 16(1): 53-62, Jan. 5, 2006. p. 53, § 1., 3.—p. 58.
Punnakitikashem et al. "Multilayered Magnetic Nanodisks for Biosensing", NANO '08, 8th IEEE Conference on Nanotechnology 2008, XP031315573, p. 629-630, Aug. 18, 2008.

(Continued)

*Primary Examiner* — Micah-Paul Young

(57) ABSTRACT

A process of preparing a plurality of nanostructures, each being composed of at least one target material is disclosed. The process comprises sequentially electrodepositing a first material and the at least one target material into pores of a porous membrane having a nanometric pore diameter, to thereby obtain within the pores nanometric rods, each of the nanometric rods having a plurality of segments where any two adjacent segments are made of different materials. The process further comprises and etching the membrane and the first material, thereby obtaining the nanostructures.

24 Claims, 14 Drawing Sheets

(56) References Cited

OTHER PUBLICATIONS

Su et al. "Tunable and Augmented Plasmon Resonances of Au/SiO2/Au Nanodisks", Applied Physics Letters, XP012082792, 88(6): 63118-1-63118-3, Feb. 10, 2006. p. 1.
Vavassori et al. "Static and Dynamical Properties of Circular NiFe/Cu/Co Nanodisks", Journal of Applied Physics, XP012110021, 103(7): 07C512-1-07C512-3, Feb. 28, 2008. Abstract.

\* cited by examiner

Sequencial Electrodeposition

Template Etching

Sacrificial Layer Dissolution

NANOSTRUCTURES AND PROCESS OF PREPARING SAME

RELATED APPLICATION/S

This application is a National Phase of PCT Patent Application No. PCT/IL2009/000887 having International filing date of Sep. 10, 2009, which claims the benefit of priority from U.S. Application No. 61/136,515 filed on Sep. 11, 2008. The contents of the above applications are all incorporated herein by reference.

FIELD AND BACKGROUND OF THE INVENTION

The present invention, in some embodiments thereof, relates to nanotechnology, and, more particularly but not exclusively, to multicomponent nanostructures, a process of preparing same and uses thereof.

To date, 1-D nanomaterials, especially high aspect ratio anisotropic structures like nanorods, nanowires, coaxial structures, and nanotubes, are widely prepared via a template-based method, which has been shown to be to be a straightforward synthetic route to this effect. The template-base method utilizes a template membrane, with a dense-pore geometry and monodisperse diameters with a narrow diameter distribution. Exemplary utilizable membranes are made of polycarbonate or anodized aluminum oxide (AAO).

The formation of metallic nanostructures within the template pores can be implemented either by chemical electroless reduction [23] or electrodeposition. Electroless deposition of an appropriate electrolytic bath inside the pores may be accomplished in a two-step process: initiation, and deposition. Deposition begins at the pore walls, creating hollow metal nanotubes within the pores at short deposition time, but as deposition time increases, the membrane pore fills and the nanotube becomes a nanorod. Alternatively, in electrochemical deposition, the material to be deposited into the template membrane must be both easily reduced and conductive, in order to form the required nanostructures. Depending on the sequential electrochemical synthesis method used, nanorods composed of metals, polymers, and semiconductors may be fabricated.

Nanostructures are formed using the template membrane via unidirectional growth, which allows varying the composition of the nanostructures in the axial direction, via, for example, sequential deposition. Such template-based building blocks offer exciting applications, such as, for example, nanorods consisting of 1 µm-long Pt and Au segments, which are able to move autonomously in aqueous hydrogen peroxide solutions by the catalytic formation of oxygen at the Pt end [17-19].

Multi-segmented nanorods of Au—CdS—Au and Au—Ppy-Au [20], which possess unique electronic properties for functioning as nanodiodes and nanoresistors, respectively, were also obtained by template-based method. The multiplexed detection and sensing of biological analytes with the use of striped metallic nanorods known as Nanobarcodes [21] (NBs) were also achieved through sequential electrochemical deposition. Bifunctional Au/Ni nanorods were shown to be an effective tool in gene transfer [22].

SUMMARY OF THE INVENTION

The present invention, in some embodiments thereof, relates to nanotechnology, and, more particularly but not exclusively, to multicomponent nanostructures, a process of preparing same and uses thereof.

The present inventors have devised and successfully practiced novel processes for preparing nanostructures, while reproducibly controlling physical and chemical parameters, such as shape, dimensions (diameter, thickness, aspect ratio) and composition, of the obtained nanostructures. In experiments performed by the present inventors, these processes have been utilized for preparing highly uniform single-segmented, multi-segmented and multi-component disk-shaped nanostructures with defined parameters, via high throughput syntheses.

According to an aspect of some embodiments of the present invention there is provided a process of preparing a plurality of nanostructures, each being composed of at least one target material. The process comprises: sequentially electrodepositing a first material and the at least one target material into pores of a porous membrane having a nanometric pore diameter, to thereby obtain within the pores nanometric rods, each of said nanometric rods having a plurality of segments wherein any two adjacent segments are made of different materials; and etching the membrane and the first material, thereby obtaining the nanostructures.

According to some embodiments of the invention the process further comprises, prior to sequentially depositing the first material and the at least one target material, depositing a blocking layer onto a first side of the porous membrane, so as to substantially block the pores from the first side.

According to some embodiments of the invention the process further comprises, subsequent to sequentially electrodepositing the first material and the at least one target material, removing the blocking layer.

According to some embodiments of the invention the electrodepositing the at least one target material is independently effected by a method selected from the group consisting of a galvanostatic electrochemical deposition, a potentiostatic electrochemical deposition, a pulsed-current electrochemical deposition, and a cyclic-voltammetry electrochemical deposition.

According to some embodiments of the invention an average size of the nanostructures is manipulated by at least one of: the pore diameter of the membrane, a duration of each of the electrodepositing the at least one target material, a method by which each of the electrodepositing is effected and a current at which the electrodepositing is effected.

According to some embodiments of the invention the process further comprises, prior to the etching: chemically protecting the nano structures.

In some embodiments of the present invention a first material is electrochemically deposited onto the porous membrane prior to any other electrochemical deposition, and another material is subsequently deposited by electrochemical deposition onto the first material. When the membrane and first material are etched, a nanostructure of the other material is formed.

In some embodiments of the present invention, a first material is electrochemically deposited onto the porous membrane prior to any other electrochemical deposition, and a plurality of materials is sequentially deposited by electrochemical deposition onto the first material, so as to form within the membrane a nanostructure having a base segment made of the first material and all other materials above the base segment (e.g., arranged layerwise). When the membrane and first material are etched, a nanostructure of a plurality of materials is formed.

In some embodiments of the present invention, a first material is electrochemically deposited onto the porous membrane prior to any other electrochemical deposition, and one or more target materials are deposited by electrochemical deposition onto the first material. Subsequently, another segment of first material followed by one or more target materials is electrochemically deposited, to form a nanostructure having two non adjacent segments of first material. The procedure can be repeated any number of times to form a nanostructure rod having three or more non-adjacent segments of first material. When the membrane and first material are etched, a plurality of nanostructures is formed from each nanostructure rod. The advantage of this embodiment is that it substantially increases the number of nanostructures which can be prepared per unit area. Each nanostructure rod can comprise at least 5, more preferably at least 10, more preferably at least 50, more preferably at least 100, more preferably at least 200, more preferably at least 400, more preferably at least 500 segments.

In some embodiments, the preparation is performed as described above, but without the base segment of first material.

Hereinafter, the phrase "plurality of materials" encompasses also two materials, namely, a first and a second material. Similarly, the phrase "multi-component" encompasses "dicomponent", unless otherwise indicated.

Each of the materials used in a multi-component nanostructures system can independently be a metal, an electropolymerized polymer or a semiconductor material, as exemplified hereinbelow.

Thus, multicomponent nanostructure systems can be made from a plurality (two or more) of metals, from a plurality of semiconductor materials, from a plurality of organic polymers and from any combination thereof, namely, a metal and an organic polymer, a metal and a semiconductor material, a mixture of different metals, etc.

In general, an average size of the nanostructures, as well as other physical and chemical properties of the obtained nanostructures, can be manipulated by the pore size of the membrane, a duration of the electrochemical deposition of the target material(s), a technique by which the electrochemical deposition of the target material(s) is effected and/or a current at which the electrochemical depositing is effected.

The pore size of the membrane can be manipulated by techniques known in the art, such as, for example, ALD.

In some embodiments, the first layer comprises copper.

In some embodiments, the process further comprising, prior to the etching: chemically modifying the nanostructures, as detailed herein. An example includes thiolation of gold nanostructures.

According to an aspect of some embodiments of the present invention there is provided a process of preparing nanostructures. The process comprises providing a nanometric rod having a plurality of non-adjacent segments of first material and a plurality of non-adjacent segments of least one target material, and etching the segments of the first material, thereby obtaining nanostructures made of the least one target material.

According to some embodiments of the invention the nanometric rod has an aspect ratio of at least 5, and a diameter of less than 300 nm.

According to some embodiments of the invention the first material comprises copper.

According to some embodiments of the invention the target material(s) is independently selected from the group consisting of a metal, a semiconductor material and an electropolymerized organic polymer.

According to some embodiments of the invention there is a plurality of target materials, and the nanostructures are multi-segmented nanostructures.

According to some embodiments of the invention the nanostructure is generally shaped as a disk.

According to an aspect of some embodiments of the present invention there is provided a nanostructure obtained by the process described herein.

According to an aspect of some embodiments of the present invention there is provided a nanostructure being composed of at least two materials and having an aspect ratio of less than 2, and a thickness of less than 100 nm.

According to some embodiments of the invention the nanostructure is composed of at least three materials.

According to some embodiments of the invention the nanostructure is generally shaped as a disk.

According to some embodiments of the invention each of the at least two materials is independently selected from the group consisting of a metal, a semiconductor material and an organic polymer.

According to some embodiments of the invention the materials comprise at least two metals being different from one another. According to some embodiments of the invention the materials comprise at least three metals being different from one another. According to some embodiments of the invention the materials comprise at least one metal and at least one organic polymer. According to some embodiments of the invention the materials comprise at least two organic polymers being different from one another. According to some embodiments of the invention the materials comprise at least one metal and at least one semiconductor material.

According to some embodiments of the invention the nanostructure comprises a gold segment attached to a nickel segment, the nanostructure having a diameter of less than 200 nm.

According to some embodiments of the invention the nanostructure comprises a gold segment, a nickel segment and a platinum segment, the nanostructure having a diameter of less than 200 nm.

According to some embodiments of the invention the nanostructure comprises a gold segment and a polypyrrole segment, the nanostructure having a diameter of less than 200 nm.

According to some embodiments of the invention the nanostructure comprises a polyaniline segment and a polypyrrole segment, the nanostructure having a diameter of less than 200 nm.

According to some embodiments of the invention the nanostructure comprises a gold segment, a cadmium telluride segment and a nickel segment, the nanostructure having a diameter of less than 200 nm.

According to some embodiments of the invention the nanostructure has an aspect ratio of less than 1.

According to an aspect of some embodiments of the present invention there is provided a contrast agent comprising the nanostructure described herein.

According to an aspect of some embodiments of the present invention there is provided a chemical sensor comprising the nanostructures described herein.

According to an aspect of some embodiments of the present invention there is provided a method of modifying viscosity of a liquid, comprising introducing the nanostructures described herein to the liquid thereby modifying the viscosity of the liquid.

According to an aspect of some embodiments of the present invention there is provided a solid state device, comprising the nanostructures described herein.

According to an aspect of some embodiments of the present invention there is provided a liquid crystal composition, comprising the nanostructures described herein.

According to an aspect of some embodiments of the present invention there is provided a field emission device, comprising the nanostructures described herein.

According to an aspect of some embodiments of the present invention there is provided apparatus for electron emission lithography, comprising the nanostructures described herein.

According to an aspect of some embodiments of the present invention there is provided a method or reinforcing a material, comprising incorporating the material with the nanostructures described herein, thereby reinforcing the material.

According to an aspect of some embodiments of the present invention there is provided a heat transfer device, comprising the nanostructures described herein.

According to an aspect of some embodiments of the present invention there is provided a composition for contrast enhancement in MRI, the composition comprising the nanostructures described herein and a physiologically acceptable medium According to an aspect of some embodiments of the present invention there is provided a disk-shaped nanostructure, composed of at least two segments along a symmetry axis thereof.

Further according to the present embodiments, there is provided a nanostructure having an aspect ratio of less than 2 and being composed of at least two materials.

Further according to the present embodiments, there is provided a nanostructure, having a thickness which is less than 100 nm and being composed of at least two materials.

Further according to the present embodiments, there is provided a nanostructure comprising a gold segment attached to a nickel segment, the nanostructure having a diameter of less than 200 nm and an aspect ratio of less than 2.

Further according to the present embodiments, there is provided a nanostructure comprising a gold segment, a nickel segment and a platinum segment, the nanostructure having a diameter of less than 200 nm and an aspect ratio of less than 2.

Further according to the present embodiments, there is provided a nanostructure comprising a gold segment and a polypyrrole segment the nanostructure having a diameter of less than 200 nm and an aspect ratio of less than 2.

Further according to the present embodiments, there is provided a nanostructure, comprising a polyaniline segment and a polypyrrole segment, the nanostructure having a diameter of less than 200 nm and an aspect ratio of less than 2.

Further according to the present embodiments, there is provided a nanostructure, comprising a gold segment, a cadmium telluride segment and a nickel segment, the nanostructure having a diameter of less than 200 nm and an aspect ratio of less than 2.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
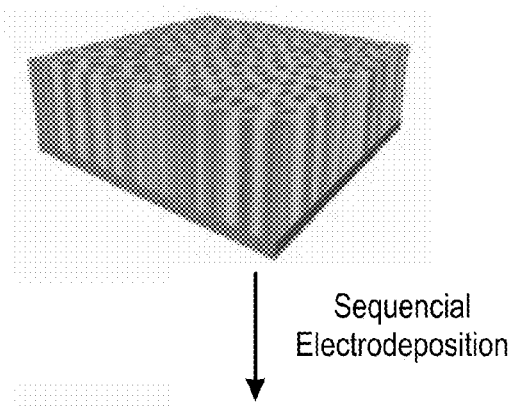
FIGS. 1A-E present schematic illustrations of a procedure for preparing nanostructures according to some embodiments of the present invention.

The present invention, in some embodiments thereof, relates to nanotechnology, and, more particularly but not exclusively, to multicomponent nanostructures, a process of preparing same and uses thereof.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have devised and successfully practiced novel processes for preparing nanostructures, while reproducibly controlling physical and chemical parameters, such as shape, dimensions (diameter, thickness, aspect ratio) and composition, of the obtained nanostructures. In experiments performed by the present inventors, these processes have been utilized for preparing highly uniform single-segmented, multi-segmented and multi-component disk-shaped nanostructures with defined parameters, via high throughput syntheses.

The novel methodology described herein utilizes template synthesis to form a novel family of nanoscale building blocks. By this methodology, the production of different configurations of metal units that function as single segments within multicomponent metallic disk-like nanostructures is achieved. Hybrid structures of metallic and non-metallic elements are also produced. By controlling process parameters, shape- and dimension-controlled nanostructures of defined chemical composition and morphology are obtained.

Thus, a template-based innovative methodology for the straightforward, systematic electrochemical synthesis of a novel generation of multicomponents and/or multi-segmented disk-like nanostructures of controlled dimensionality is presented herein. The methodology involves a sequential deposition of multiple segments, with the use of nanoporous membranes as templates for the preparation of the novel nanostructure family. This deposition method provides a reproducible and optionally high-throughput preparation approach for a wide range of nanostructures, including, without limitation, metallic nanostructures, semiconductor nanostructures, polymeric nanostructures, hybrid nanostructures and multi-segmented nanostructures.

Some embodiments of the present invention relate to a nanostructure, which can be a multicomponent nanostructure, namely, is formed of at least two, or at least three, different materials.

In some embodiments of the present invention the nanostructures are hybrid nanostructures, namely they include at least two materials of different groups of materials. The groups of materials can include, without limitation, metals, electropolymerized polymers and semiconductor materials. Thus, for example, a hybrid nanostructure according to some embodiments of the present invention can include at least one metal and at least one organic (electropolymerized) polymer, or at least one semiconductor material and at least one organic (electropolymerized) polymer, or at least one semiconductor material and at least one metal, or least one semiconductor material, at least one organic (electropolymerized) polymer and at least one metal.

Figure 7A:
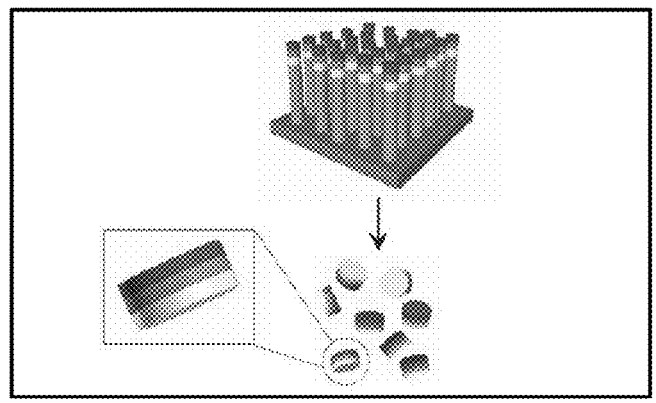
FIGS. 7A-C present a schematic illustration of a general synthesis of multi-segmented disk-like nanostructures by the sequential deposition of materials into nanoporous (AAO, Polycarbonate) templates according to some embodiments of the invention (FIG. 7A); a SEM image of multi-segmented Au—Ni—Pt disk-like nanostructures, respectively, which exhibits clear contrasts between the three different segments (bright Au ends, dark Ni, and bright Pt domain) (FIG. 7B), and a close-up SEM image of a collection of multi-segmented Pt—Ni—Au disk-like nanostructures, which demonstrates the uniformity of the resulting disk-like nanostructures (Scale bar: 95 nm) (FIG. 7B Inset); and an energy-dispersive X-ray spectroscopy (EDS) of the Ni, Pt and Au domains of a single tri-segmented nanostructure (FIG. 7C), and a close-up SEM image of a single multi-segmented Au—Ni—Pt disk-like nanostructure, with a diameter of about 100 nm (FIG. 7C, Inset).

When the nanostructure includes more than one material, the different materials can be arranged layerwise within the nanostructure preferably along a longitudinal axis thereof. Such nanostructures are referred to herein as "multi-segmented nanostructures". The longitudinal axis is generally parallel to a surface forming the periphery of the nanostructure. For example, when the nanostructures is shaped generally as a disk or generally as a cylinder, the longitudinal axis can be the symmetry axis of the disk or cylinder or parallel to the symmetry axis of the disk or cylinder. A representative example of such multi-segmented nanostructure is schematically illustrated in the inset of FIG. 7A.

In some embodiments of the present invention the nanostructures have small aspect ratio. In nanotechnology, aspect ratio is defined as the length or the thickness divided by the diameter of the structure. In various exemplary embodiments of the invention at least a few of the nanostructures have an aspect ratio which is less than 5, more preferably less than 2, more preferably less than 1, more preferably less than 0.5, e.g., 0.4.

In various exemplary embodiments of the invention the thickness of the nanostructure is less than 200 nm, or less than 100 nm, more preferably less that 80 nm, more preferably less that 60 nm, more preferably less that 40 nm, more preferably less that 20 nm, more preferably less that 10 nm, more preferably less than 5 nm, say 4 nm or less. The thickness of the nanostructure is defined as the length of the nanostructures along a longitudinal axis thereof. In any of the above thickness values, the nanostructure can be a multicomponent nanostructure, multi-segmented nanostructure and/or hybrid nanostructure.

In various exemplary embodiments of the invention the diameter of the nanostructure is from about 5 nm to about 300 nm, more preferably from about 20 nm to about 300 nm, more preferably from about 20 nm to about 250 nm.

The nanostructure of the present embodiments can have any geometrical shape. In various exemplary embodiments of the invention the nanostructure is shaped generally as a disk or generally as a cylinder, preferably of small aspect ratio as further detailed hereinabove.

Nanostructures shaped as a disk are referred to herein interchangeably as "nanodisks", "disk-like nanostructures", "disk-shaped nanostructures", "disk nanoscale particles", "disk nanoparticles", and as variations of the forgoing.

According to some embodiments of the present invention, there is provided a collection (plurality) of nanostructures. In these embodiments, at least a few of the nanostructures in the collection have the characteristics described above.

By "at least a few" it is meant at least 20%, at least 30%, at least 40%, at least 50%, at least 60%, at least 70%, and preferably at least 80%, at least 90%, at least 95%, at least 98% and even 100% of the collection of nanostructures.

The collection of nanostructures can be provided in dry environment or in liquid (solution) as desired. The number of nanostructures in the collection is not limited and can be any number above $10^3$ or above $10^6$ or above $10^9$ or above $10^{12}$. Preferably, but not necessarily, the collection has a high degree of uniformity with respect to the at least one of the shape, size, composition and morphology of the nanostructures. Such uniformity can be assessed, for example, by microscopy (e.g., scanning electron microscopy, transmission electron microscopy, etc.), whereby at least a portion of the collection is imaged and the degree of similarity between nanostructures in the collection is assessed.

In some embodiments of the present invention at least 70% or at least 80% or at least 90% of the nanostructures in the collection have generally the same shape. In some embodiments of the present invention at least 70% or at least 80% or at least 90% of the nanostructures in the collection have generally the same size (e.g., within 10% deviation). In some embodiments of the present invention at least 70% or at least 80% or at least 90% of the nanostructures in the collection have generally the same composition and/or morphology.

When feasible, the nanostructures provided herein can be either crystalline or amorphous. In some embodiments, the nanostructures are crystalline.

Crystalline nanostructures can be single-crystalline nanostructures, or polycrystalline nanostructures, when the nanostructures are in more than one crystalline form.

In some embodiments, in a collection of nanostructures, at least a few of the nanostructures in the collection, as defined herein, have the same crystallinity (e.g., amorphous, single-crystalline, or polycrystalline).

The nanostructures of the present embodiments can be employed in many applications. Representative examples of such applications are provided hereinunder.

According to an aspect of some embodiments of the invention, there is provided a process of preparing nanostructures. The process provided herein was devised by the present inventors, and has been successfully practiced, for producing collections of nanostructures with high uniformity and controllability of the shape, dimension, morphology and composition of the nanostructures. The process provided herein allows efficient production of single-segmented, multi-segmented and multi-component nanostructures.

Broadly speaking, the process is a template-based process in which a nanoporous membrane is used as a template for preparation of a plurality of elongated nanostructures.

A representative example of a process according to some embodiments of the present invention is illustrated in FIGS. 1A-D. The process preferably comprises a sequential deposition operation in which at least a first material and a target material are sequentially deposited into pores of a porous membrane having nanometric pore diameter. A schematic illustration of a porous membrane is shown in FIG. 1A.

The term "nanometric diameter" as used herein refers to a diameter below 1000 nanometers (nm).

In various exemplary embodiments of the invention the diameter of the pores is from about 5 nm to about 300 nm, more preferably from about 20 nm to about 300 nm, more preferably from about 20 nm to about 250 nm.

Figure 1F:
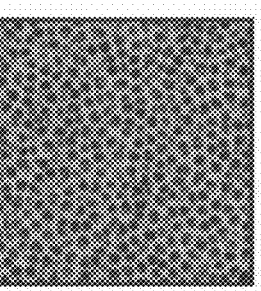
FIG. 1F presents a top view SEM image of an anodized aluminum oxide (AAO) template, an exemplary template membrane according to some embodiments of the invention, with an average diameter of 100 nm.

Porous membranes are known in the art and any such known membrane can be used, provided that the average pore diameter of the membrane is nanometric. Representative examples of membranes suitable for the present embodiments include, without limitation, anodized aluminum oxide (AAO) membrane, polycarbonate membrane or any other polymeric membrane, either commercially available or synthetically designed. A top view SEM image of an AAO membrane with an average diameter of 100 nm is shown in FIG. 1F.

The depth of the pores in the membrane (which corresponds to the average thickness of the membrane) is preferably substantially larger (e.g., at least 10 times larger, more preferably at least 100 times larger) than the average diameter. Preferably, the depth of the pores is of the order of 10-100 μm, but larger or smaller pores, are also contemplated.

During the deposition process, the pores can be filled either partially or throughout their depth as desired.

The deposition of the materials into the pores is preferably performed via electrochemical deposition (ECD). ECD is a process in which an electrolyte solution containing ionic substance is subjected to a potential difference (for example using two electrodes), so that an electrochemical process is initiated. Upon application of potential difference, the substance in the electrolyte solution is oxidized or reduced, and is consequently deposited.

Various techniques for performing ECD are known in the art, and all of these techniques are executable in the context of the present embodiments. Representative examples of ECD techniques include, without limitation, galvanostatic ECD, potentiostatic ECD, pulsed-current ECD and cyclic-voltammetry ECD, all of which are well-known to those skilled in the art of material deposition, and are described, e.g., in U.S. Pat. Nos. 4,933,052, 5,320,719, 4,515,671 and 6,869,671, the contents of which are hereby incorporated by reference.

In some embodiments, the electrochemical deposition is performed by a pulsed-current technique. As exemplified in the Examples section that follows, such a technique can facilitate production of nanostructures having low aspect ratio.

The deposition is "sequential" in the sense that once the deposition of one of the materials is completed, another material is deposited into the pores atop of the previously deposited material. Thus, once all the materials are sequentially deposited, the pores contain segmented columns of materials where each column is formed of two or more segments and where any two adjacent segments are made of different materials.

The sequential deposition can include two depositions, such that one segment of the first material and one segment of a target material are formed, or, it can include three or more depositions, such that three or more segments (e.g., a plurality of segments of a first material and a plurality of segments of the target material) are formed.

In some embodiments, each nanometric rod in the template membrane comprises a plurality of non-adjacent segments of the first material and a plurality of non-adjacent segments of the at least one target material.

The conditions and techniques under which each electrodeposition in the sequential deposition operation described herein is performed can be the same or different, and are controllable, as detailed hereinbelow.

Sequential electrodeposition offers some advantages, as follows. Sequential electrodeposition circumvents the need to use expensive instrumentation, the procedure can be carried out at room temperature or under low-vacuum pressures, the process is not time-consuming, and lastly, it offers uniformity as well as chemical diversity of the synthesized nanostructures. For metals, electrochemical deposition is accomplished by the reduction of metal ions from an electrolytic solution through the application of a negative potential. This may be performed under galvanostatic, potentiostatic, pulsed electrodeposition, or cyclic-voltammetry conditions [24-27]. The diameter of the nanostructure is dictated by the nominal pore size of the template, while its thickness or length is directly related to the time and the amount of negative charge passed through the system, as is further detailed hereinbelow.

The deposited materials can be of any type, including metals, semiconductor materials and organic materials.

At least one of the deposited materials is a material which is intended to form the nanostructures or part thereof. This material is referred to as a "target material". The process can include deposition of one or more target materials, so as to form a single-segmented nanostructure, a di-segmented nanostructure (if two or more target materials are deposited sequentially), a tri-segmented nanostructure (if three or more target materials are deposited sequentially), etc.

At least one of the deposited materials is a material which is intended to be etched at later stages of the process. The process can include deposition of one or more such materials. These materials are referred to herein as first material, second material, etc. Interchangeably, these materials are collectively referred to as sacrificial materials.

Target materials can also be deposited non-sequentially. For example, after deposition of one or more target material, a sacrificial material is deposited, and thereafter at least one other target material is deposited, so as to form a heterogeneous collection of nanostructures from a single column.

Representative example of target materials suitable for the present embodiments, include, without limitation, metals, semiconductor materials and organic polymers.

Exemplary metals that are suitable for use in the context of any of the embodiments described herein include any metal or a metal alloy that is compatible with electrochemical deposition. Desirably, the selected metal has properties (e.g., electrical properties, photoluminiscent properties) that can be utilized in nanoscale applications.

Metal alloys, comprising two or metals as described herein, are also contemplated. Deposition of metal alloys can be performed either by co-depositing (simultaneously) the metals from two or more separate electrolyte solutions, each containing ions of a different metal, or by depositing an electrolyte solution that contains a mixture of metal ions.

Representative examples include, without limitation, gold (Au), silver (Ag), platinum (Pt), nickel (Ni), Titanium (Ti), Titanium tungstide and indium-tin-oxide.

Semiconductor materials that can be utilized in the context of the present embodiments include any material that exhibits semiconducting properties. These include organic polymers, as detailed hereinbelow and inorganic materials.

Exemplary semiconductor materials include, but are not limited to, CdTe, CdS, CdSe, ZnS, ZnO, GaAs, ZnTe, CdTeSe, Si, Ge, a Si/Ge alloy, GaAs, gallium phosphide, gallium nitride, $TiO_2$, $TiS_2$ and others.

In some embodiments, semiconductor materials are prepared in situ, by co-deposition from two or more electrolyte solutions of ions composing the semiconductor, or by deposition from an electrolyte solution that contains a mixture of ions. The ratio of the elements composing the semiconductor will be determined by the rate of the electrochemical reaction of each element, which, in turn, can be further determined by the concentration of the corresponding ions in the electrolyte solution. See, for example, Example 9. Accordingly, the semiconductor properties can be determined.

Exemplary organic polymers are conductive polymers, which typically exhibit semiconductor properties. In some embodiments, the organic polymers are electropolymerized organic polymers, which can be deposited by electropolymerization of a solution of the corresponding electropolymerizable monomers. Any electropolymerizable monomer or a mixture of monomers can be used for forming the organic polymers. Accordingly, organic co-polymers are also contemplated. Examples, without limitation, of electropolymerized polymers include polypyrroles, polythiophenes, poly(ethylenedioxy)thiophene, compounds of poly) heteroaromatic vinylenes), polyvinylphosphate, polyanilines, poly-p-phenylenes, poly-p-phenylene sulfide, and poly(2,5-thienylene), including derivatives thereof and co-polymers thereof.

By "derivative" it is meant that one or more monomeric units that form the polymer is substituted by one or more substituents. The electropolymerized organic polymer can be either conductive or non-conductive.

The sacrificial material can be of any type, provided it is different from the target material and that it can be etched under relatively mild conditions, such that the target material remains un-etched. The sacrificial material is therefore selected suitable for selective etching with respect to the target material(s). In experiments performed by the present inventors it was found that the sacrificial material can be copper. Alternatively, the sacrificial material is silver. Additional sacrificial materials include metal alloys.

Figure 1B:
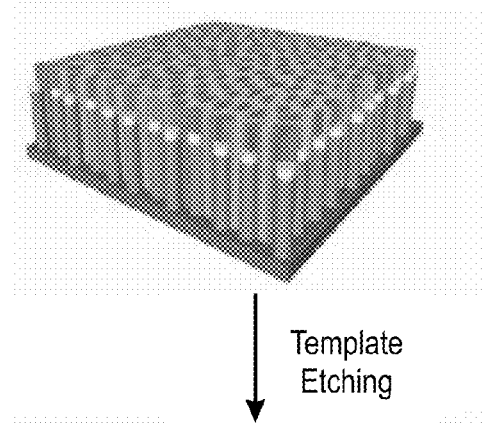

The deposited materials within the pores are illustrated in FIG. 1B. In the exemplified illustration of FIG. 1B the target material (appears brighter in FIG. 1B) is deposited on top of the sacrificial material. However, this need not necessarily be the case, since, for some applications, it may not be necessary for the target material to be on top of the sacrificial material. For example, a segment of target material can be between two segments of sacrificial material. Optionally, the target material can be deposited as the first layer.

Figure 1C:
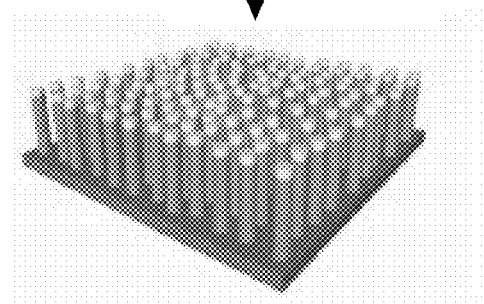
Figure 1D:
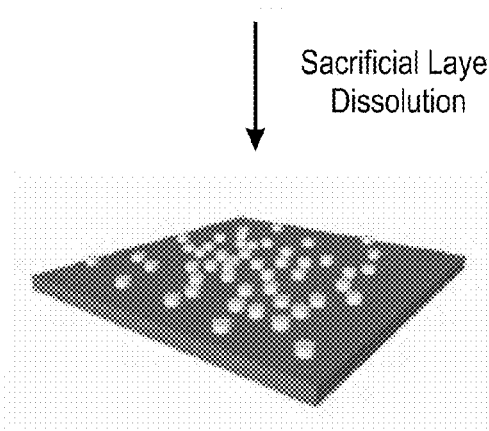

Once the materials are deposited, the template membrane and the first (namely non-target) material are etched, thereby obtaining nanostructures. The etching is illustrated in FIGS. 1C and 1D, where FIG. 1C illustrates the result of the etching of the membrane and FIG. 1D shows the result of the etching of the sacrificial material. The etching technique is selected in accordance of the materials to be etched. For example, when the membrane is made of AAO it can be etched with sodium hydroxide solution, and when the membrane is made of polycarbonate it can be etched or dissolved in methylene chloride. The sacrificial material can be etched by wet chemical etching. For example, copper can be etched by dissolution in the presence of, for example, an ammonium persulfate solution.

It was found by the Inventors of the present invention that the process delineated above can be tailored to provide nanostructures of a desired shape, size and composition. Specifically, the peripheral shape of the produced nanostructures is controlled by the shape of the internal walls of the membrane. For example, round internal walls can be used to produce generally cylindrical or disk-like nanostructures. The thickness of the deposited segments within the pores can be selected in accordance with the desired aspect ratio or thickness of the nanostructures. For example, in the illustration in FIG. 1B the thickness of the segments of target material is substantially shorter than the thickness of the sacrificial material such that the formed nanostructures have an average thickness which is substantially smaller (e.g., at least 100 times smaller or at least 1,000 times smaller or at least 5,000 times smaller or at least 10,000 times smaller) than the thickness of the membrane. The number of deposited sacrificial material segments within the pores can be selected to control the number of nanostructures which are produced from a single pore, hence also the multiplicity of the process. The number of adjacent target material segments within a pore can be selected to control the composition of the nanostructures. For example, two or more adjacent target material segments within a pore result in multi-segmented nanostructure, as detailed hereinabove.

The size of the nanostructures can be determined by the conditions and durations of the electrodeposition process. Thus, the size of the nanostructures can be manipulated by, for example, the electrodeposition technique utilized, the time during which current is applied, the current concentration, the concentration of a corresponding ion in the electrolyte solution, etc., and any combination of the forgoing. Manipulation of the above parameters can be performed manually or automatically, e.g., by means of a computerized controller, while determining the parameters required so as to achieve a desired size.

The size of the nanostructures can alternatively or additionally be determined by the diameter of the pores in the template membrane. The diameter of the pores can be dictated by a commercially available membrane selected for the process, or, alternatively, can be further manipulated, by, for example, atomic layer deposition technique, which can be utilized to reduce the pores diameter prior to the sequential deposition of the materials.

Optionally, prior to the deposition of the materials, a blocking layer is deposited onto one side of the porous membrane, so as to substantially block the pores from that side.

As used herein "substantially blocks" refers to blocking of at least one 80%, more preferably at least 90%, more preferably at least 95% of the area of at least 80% of the pores at the first side. In various exemplary embodiments of the invention the blocking layer is conductive. In some embodiments, the blocking layer is made of a sacrificial material. The sacrificial material can be the same as the first material, but is preferably different, so as to allow removal of the first material and the blocking layer sequentially, under different conditions. For example, the blocking layer can comprise silver. However, other blocking layers are contemplated.

The type of blocking layer is selected in accordance with the type of the target material(s) from which the nanostructures are to be made. That is, the material composing the blocking layer is selected so as to remain intact during the electrodeposition process. Accordingly, a substance composting the blocking is selected so as to have a redox potential that is higher than that of the target material(s), such that it does not undergo an electrochemical reaction under the conditions at which the electrodeposition process is effected.

The deposition technique of the blocking layer is selected in accordance with the type of membrane and the desired blocking layer. For example, when the membrane is made of AAO or polycarbonate, a silver blocking layer can be deposited by thermal evaporation.

Once the materials are deposited into the pores and the membrane and sacrificial materials are etched, the nanostructures remain on the blocking layer. Subsequently, the blocking layer can be removed, for example, by dissolution or decomposition. For example, a silver blocking layer can be dissolved in a nitric acid solution.

Also contemplated, are embodiments in which the blocking layer is removed prior to or concomitantly with the etching of the membrane and/or the sacrificial material.

In some embodiments, chemical modification of the nanostructures is performed upon forming the nanorods within the membrane pores. Chemical modification can be performed either prior to, or subsequent to, etching the template membrane, etching the first material or etching the blocking layer, if present.

In some embodiments, chemical modification is effected so as to allow placing the obtained nanostructures in a liquid environment (e.g., solution), or in dry environment, by modifying the surface properties thereof (e.g., applying a negative or positive charge to the surface, so as to prevent aggregation and obtain discrete nanoparticles in a solution or other medium). The chemical modification can also be performed so as to protect the nanostructures during the etching procedure.

In some embodiments, sequential electrodeposition of the first material and a target material is performed repeatedly, so as to obtain a nanometric rod within each pore of the porous membrane. The nanometric rod comprises multi-segments of the first material and the target material, as described hereinabove. Upon removing the membrane, the first material and the blocking layer, if present, a plurality of nanostructures is produced from each nanorod.

The methodology taught herein for the formation of single-component disk-like nanostructures with unique morphology, and the ability to control their thickness and diameter, offers the opportunity for the synthesis of multi-segmented disk-like nanostructures.

A synthesis of multicomponent, and/or multi-segmented, nanostructures (e.g., disk-shaped nanostructures) of unlimited dimensions and chemical composition control is therefore presented herein. The present embodiments thus provide a technique for the construction of a new generation of disk-like nanoscale building blocks comprising discrete segments of pre-designed dimensions and chemical composition. In experiments performed by the present inventors, this technique has proven to be effective for the preparation of a wide range of metallic, semiconductor, polymeric and hybrid multicomponent disk-like nanostructures. In addition, the present inventors have demonstrated large-scale synthesis, reproducible shape and dimensions, by controlling the times, rates and technique of the electrodeposition for each segment. The present embodiments allow exploiting the surface chemistry of the segments due to the various chemical properties of the different materials. The present embodiments thus offer considerable diversity and multifunctionality of nanostructures.

In some embodiments, multi-segmented nanostructures are prepared by sequentially depositing a first material, and a plurality of target materials. The sequence of the deposition processes determines the composition of the nanostructure. Thus, for example, sequential deposition of a first material, one target material and another target material, in that order, results in di-degmented nanostructures composed of the two target materials. More that two target materials in each segment are also contemplated, as demonstrated in the Examples section that follows.

The materials composing the di-segmented and multi-segmented nanostructures as be manipulated as desired, so as to produce nanstructures composed of, for example, two or more metals, two or more organic polymers, two or more semiconductor materials, as well as hybrid nanostructures, as detailed herein.

Multi-segmented nanostructures can be utilized as is, but may further be utilized such that upon a certain application thereof, one or more segments are removed, leaving nanostructures composed of the other segments. For example, a nanostructure having two or more segments (e.g., a nickel segment and a gold segment) can be incorporated in an appliance or a composition. Following the incorporation, one of the segments (e.g., the nickel segment) can be etched.

Once the nanostructures are formed, they can be placed in a liquid, or any other environment. Optionally, the nanostructures can be deposited on a solid substrate (e.g., a silicon wafer).

Exemplary embodiments of the methodology presented herein are described in the Examples section that follows.

The present embodiments can be used in many applications. For example, nanostructures according to some embodiments of the present invention can be used as magnetic nanostructures, useful in many biomedical applications, including, without limitation cell separation, in vivo cell and tissue labelling, contrast enhancement in magnetic resonance imaging (MRI), tumor targeting, hyperthermia therapies, drug delivery and the like.

In embodiments in which the nanostructures are used for contrast enhancement in MRI (namely they are embodied as an MRI contrast agent), they can be mixed with physiologically acceptable medium to provide a composition for contrast enhancement in MRI.

As used herein "physiologically acceptable medium" refers to a carrier or a diluent that does not cause significant irritation to an organism and does not abrogate the biological activity and properties of the administered compound. An adjuvant is included under these phrases.

The MRI contrast agent of the present embodiments can be either a positive or a negative MRI contrast agent.

As used herein, "positive MRI contract agent" refers to an agent which increases the signal of the pharmaceutical composition relative to the nearby tissues of fluids, and "negative MRI contract agent" refers to an agent which decreases the signal of the pharmaceutical composition relative to the nearby tissues of fluids.

Positive MRI contrast agents are typically used such that their dominant effect is to reduce the T1 relaxation time, and negative MRI contrast agents are typically used such that their dominant effect is to reduce the T2 relaxation time.

In any event, when the contrast enhancement composition of the present embodiments is present in a body, the composition is distinguished from its surroundings either by an enhanced or reduced NMR signal.

The magnetic properties of the MRI contrast agent of the present embodiments depend on the material from which the nanostructures are made. Generally, any type of magnetic properties is contemplated. More specifically, the MRI contrast agent of the present embodiments comprises a magnetic material which can be paramagnetic, superparamagnetic or ferromagnetic material.

The magnetic properties of the nanostructures originate from the sub-atomic structure of the material or materials from which they are made. The direction as well as the magnitude of the magnetic force acting on the material when placed in a magnetic field is different for different materials. Whereas the direction of the force depends only on the internal structure of the material, the magnitude depends both on the internal structure as well as on the size (mass) of the material. Ferromagnetic materials have the largest magnetic susceptibility compared to para- or superparamagnetic materials. Superparamagnetic materials consist of individual domains of elements that have ferromagnetic properties in bulk. Their magnetic susceptibility is larger than that of the paramagnetic but smaller than that of ferromagnetic materials.

Broadly speaking, ferromagnetic and superparamagnetic MRI contrast agents are negative MRI contrast agents and paramagnetic MRI contrast agents can be either negative or positive MRI contrast agents. The effect of paramagnetic material on the magnetic resonance signal dependents on the type and concentration of the paramagnetic material, as well as on external factors, such as the strength of the applied magnetic field. In various exemplary embodiments of the invention the MRI contrast agents which comprise paramagnetic materials are positive contrast agents.

The nanostructures of the present embodiments can be employed as a solid support for immobilizing one or more ligands thereby forming a nanostructure complex. The ligand may comprise carbohydrate groups, peptides, protein domains, nucleic acid segments or fluorescent groups. The ligand can be covalently linked to the nanostructures. Protocols for establishing covalent bonds between a ligand and a nanostructures are known in the art, see e.g., U.S. Published Application No. 20060233712. Such nanostructure complexes are particularly useful for studying ligand mediated interactions, e.g., with other carbohydrates, proteins or nucleic acids, and as therapeutics and diagnostic reagents.

When the nanostructures are used as solid support for immobilizing a ligand, the nanostructures are preferably made of a magnetic material, including paramagnetic, superparamagnetic and ferromagnetic material as described hereinabove. The nanostructures can also comprise passive metal atoms and magnetic metal atoms, at an appropriate ratio selected so as provide the nanostructures with the desired magnetic property. A representative example of such ratio is, without limitation, 5:1.

As used herein, the term "passive metal" refers to a metal which does not show magnetic properties and are chemically stable to oxidation.

When the nanostructures are used as solid support for immobilizing a ligand, they can alternatively or additionally comprise one or more semiconductor materials. Nanostructures comprising semiconductor atoms can be detected because nanometer scale semiconductor crystals are capable of acting as quantum dots, that is they can absorb light thereby exciting electrons in the materials to higher-energy levels, subsequently releasing photons of light at frequencies characteristic of the material.

In some embodiments, the nanostructure complexes comprise a detectable label. Representative examples of such labels include, without limitation, a fluorescent group, a radionuclide, a magnetic label or a dye. For example, a radionuclide can be used for allowing detection of the nanostructure complexes, e.g., using PET or SPECT, or for therapy, e.g., for damaging a target tissue or killing target cells.

The nanostructure complexes of the present embodiments can be detected using a number of techniques well known in the art. These can range from detecting the aggregation that results when the nanostructure complexes bind to another species, e.g., by simple visual inspection or by using light scattering (transmittance of a solution containing the nanoparticles), to using sophisticated techniques such as transmission electron microscopy (TEM) or atomic force microscopy (AFM) to visualise the nanostructure complexes. A further method of detecting the nanostructure complexes, particularly suitable when the nanostructures are metallic, is to employ plasmon resonance, that is the excitation of electrons at the surface of a metal, usually caused by optical radiation. The phenomenon of surface plasmon resonance exists at the interface of a metal and a dielectric material such as air or water.

The nanostructure complexes of the present embodiments can be used in various applications. In some embodiments of the invention, the magnetic properties of the nanostructure complexes are exploited in cell separation techniques which eliminate the need for columns or centrifugation.

In some embodiments of the invention, the nanostructure complexes are used to treat cancer. For example, nanostructure complexes having magnetic properties can be injected into a tumor and subjected to a high frequency magnetic field or near infrared light. The heat thus generated by the relaxation magnetic energy of the magnetic material at least partially destroys the tissue near the nanostructure complex.

In some embodiments of the invention, the nanostructure complexes are linked to therapeutically active substances such as antibodies or tumor-killing drugs. When nanostructure complexes have magnetic properties, the properties can be exploited for guide the nanostructure complexes to a target tumor. Thus, the nanostructure complexes can be used as vehicles for drug delivery. When nanostructure complexes are traceable, the efficiency of drug delivery can be assessed by tracing the nanostructure complexes. This is advantageous over traditional radioactive materials used as tracers for drug delivery, since it eliminating potential harm from radiation.

The nanostructures of the present embodiments can also be used in the detection of analytes. For example, they can be used in chemiresistor sensors or optical sensors, wherein the optical or electrical properties change in response to the presence of an analyte can be detected. In some embodiments of the present invention the nanostructures are used in a chemiresistor sensor for detection of analytes in the fluid phase.

The chemiresistor sensor of the present embodiments can comprise the conductive nanostructures of the present embodiments allocated in a medium made of a non-conductive or a semiconductor material, such as, but not limited to, functionalized organic molecules that serve either as capping ligands for the conductive nanostructures or to interlink the nanostructures in a three-dimensional network.

Figure 11A:
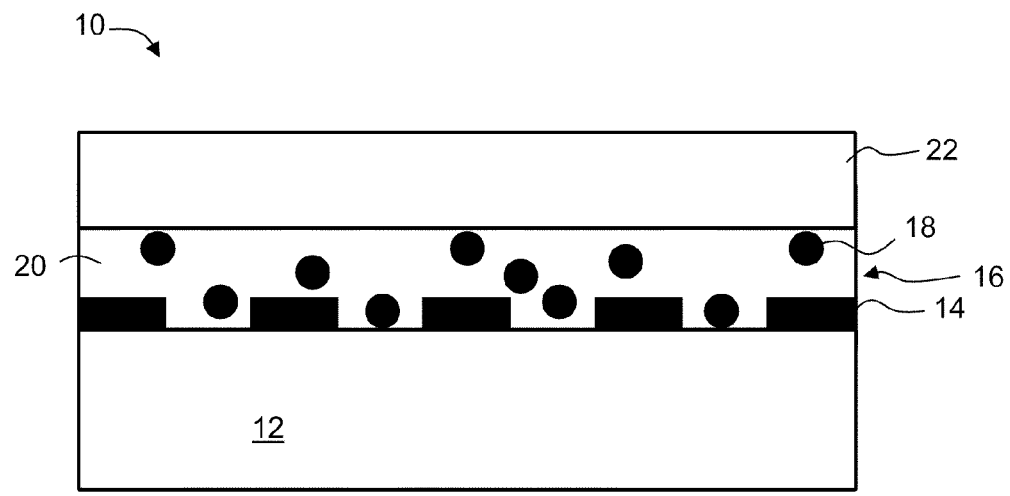
FIGS. 11A and 11B are schematic illustrations of a chemiresistor sensor, according to some embodiments of the present invention.

A schematic illustration of a chemiresistor sensor 10, according to some embodiments of the present invention is provided shown in FIG. 11A. Sensor 10 comprises a substrate 12, which can be, for example, a glass substrate, a ceramic substrate, a silicon substrate, a plastic substrate or the like. Sensor 10 further comprises a electrode structures 14 formed on or integrated with substrate 12, by any technique known in the art, include, without limitation, lithography or printing. Electrode structures 14 are preferably arranged in an interdigitated manner. Sensor 10 further comprises a nanocomposite material 16, which can comprise conductive nanostructures 18 and an embedding medium 20. Nanostructures 18 can be the nanostructures of the present embodiments provided they are made, at least in part, from an electrically conductive material, e.g., a metal. Embedding medium 20 can be made of any substance such as an electrically insulating material or a semiconductor material. In some embodiments of the present invention medium 20 is an organic matrix, preferably an organic polymeric matrix. Alternatively, nanocomposite material 16 can comprise nanostructures 18 which are capped or interlinked with mono-, bi- or polyfunctional organic ligand molecules. Optionally and preferably sensor 10 comprises a coating layer 22, preferably but not necessarily a polymeric layer, deposited on top of nanocomposite material 16. Layer 22 serves for modifying the interaction between the analyte of interest and the nanocomposite material and thus to act simultaneously as a semi-permeable membrane and as an analyte in-situ concentrator unit coupled to the sensitive layer. The polymer from which layer 22 is made can be selected in accordance with the analyte of interest.

Figure 11B:
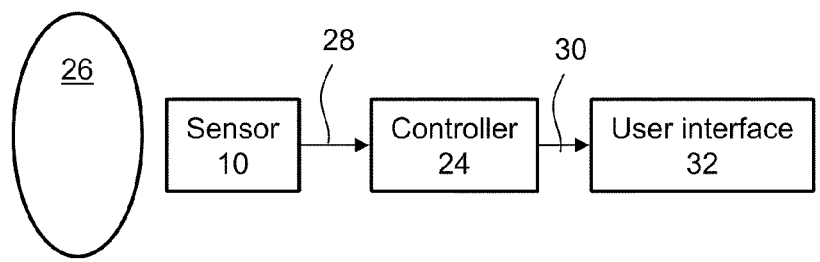

In use, sensor 10 is exposed to the environment and the analyte in the environment is sorbed in or to at the polymeric layer or the nanocomposite material. Upon sorption, the analyte is detected, preferably by measuring a change of electrical resistance, or by measuring a change in work function, a change of current through a conductive channel of FET (not shown) which interacts with the nanocomposite material, or by measuring a change of reflectance, a change of refractive index, a change of luminescence, preferably fluorescence emission, phosphorescence emission or absorbance, of said analyte sensitive layer, or by measuring a change in UV/visible or IR absorbance or transmittance spectrum of said analyte sensitive layer. The principle of operation of sensor is schematically illustrated in FIG. 11B. Sensor 10 interacts with an external environment 26 to detect the presence of analytes, or target chemical compositions therein. Sensor 10 generates a raw output signal 28 based on detection of the analytes in environment 26. Raw output signal 28 is processed by a controller 24. Controller 24 transmits a calculated output signal 30 to a user interface 32 to relay analysis of the raw output signal 28 from sensor 10. User interface 32 provides information to an external user about sensor 10 and may range from a simple alarm signal to a complex computerized screen.

The nanostructures of the present embodiments can be used as viscosity modifiers. For example, the nanostructures can be introduced into a fluid and serve as a friction reducing materials agent, which carries some of the load imposed on the fluid, and therefore helps to reduce surface damage to working parts. The type and density of nanoparticles in the fluid can be judiciously selected so as to provide a lubricant having a predetermined lubricant film thickness at the maximum shear rate and temperature of use in the target application. The type and density of nanoparticles can also be selected so as to increase the viscosity index (smaller viscosity change tendency with temperature) of the fluid. Such nanoparticles containing fluid can be targeted in its lubrication, viscosity, friction, antioxidant and thermal management characteristics to perform in modern automotive machineries.

The nanostructures of the present embodiments can also be used in the field of solid state devices. In some embodiments of the present invention the nanostructures facilitate single-electron tunneling or charging in an electronic device. Such a device has a number of advantages over bulk size electronic devices, including low power consumption, faster computation or tasking abilities, greatly increased device element densities, and the potential for multiple status states (as opposed to "1" and "0" states). In some embodiments of the present invention there is provided a single-electron solid state electronic device which comprises a substrate, a first conductive thin film layer deposited on the substrate, a thin film nanostructure layer of conductive nanostructures deposited on and in contact with the first conductive thin film layer, a dielectric spacer layer in contact with the thin film nanostructure layer, and a second conductive thin film layer deposited on and in contact with the dielectric spacer layer.

Figure 12:
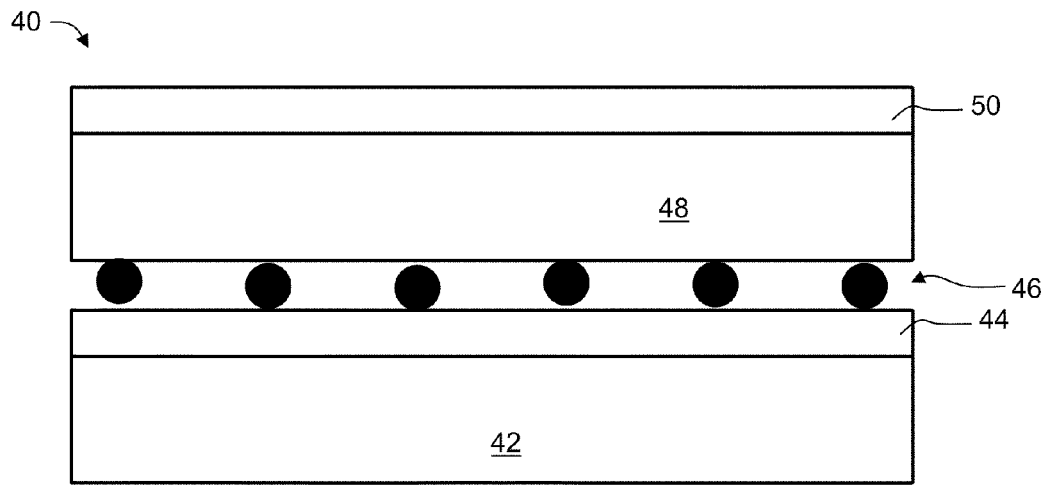
FIG. 12 is a schematic illustration of a single-electron charging or capacitance device according to some exemplary embodiments of the present invention.

FIG. 12 is a schematic illustration of a single-electron charging or capacitance device 40 according to some exemplary embodiments of the present invention. Device 40 comprises a substrate 42, which serves as a device support medium. Examples of substrates that may be used are Si wafers, $SiO_2$, GaAs wafer, alumina, mica, glass, indium tin oxide, mica, and polymer films. Applied to substrate 42 is a bottom conductive electrode film 44. Any one of a host of standard conductors such as Al, Cu, Au, or Ag may be used. Deposited on electrode 44 is a thin film (e.g., a monolayer) 46 of the nanostructures of the present embodiments. Thin film 46 can be for example, a Langmuir-Schaeffer film. Separating film 46 from a top electrode film 50 is a dielectric spacer layer 48. Dielectric spacer layer 48 is preferably provided as a thin polymeric film (e.g., polystyrene, polymethylmethacrylate, a polyether, polypropylene, polyethylene, PPV, and the like). Atop dielectric spacer layer 48 is top electrode film 50 which, like bottom conductive electrode film 44, can be any standard conductor. The active element of device 40 is film 46. In this embodiment, the nanostructures in film 46 are preferably organically functionalized.

As used herein, "organically functionalized nanostructures" refers to nanostructures that have, bound to their surface, organic molecules with specific functionalities.

Figure 13:
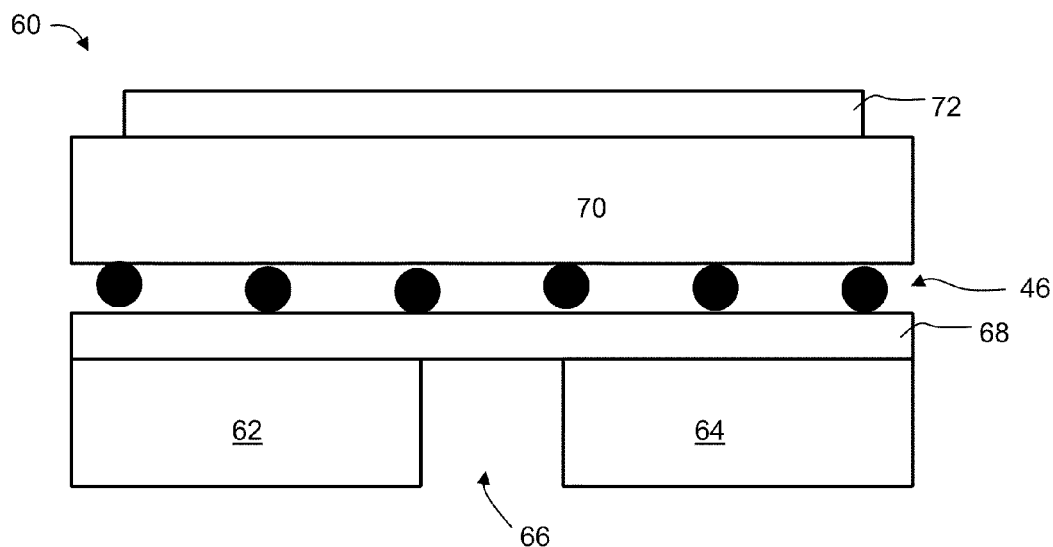
FIG. 13 is a schematic illustration of a single-electron memory device according to some exemplary embodiments of the present invention.

FIG. 13 is a schematic illustration of a single-electron memory device 60 according to some exemplary embodiments of the present invention. Device 60 comprises a source 62 and a drain 64 on a thin insulator layer 68. Source 62 and drain 64 are separated by a channel generally shown at 66. Deposited on layer 68 is thin film 46 of the nanostructures of the present embodiments, as further detailed hereinabove. An insulator layer 70 is applied to layer 46, and a gate 72 is applied to insulator layer 70.

When the nanostructures comprise a semiconductor material they can be incorporated in a semiconductor layer which can be used in a thin film transistor (TFT), large area display, radio-frequency identification tag and the like.

Figure 14:
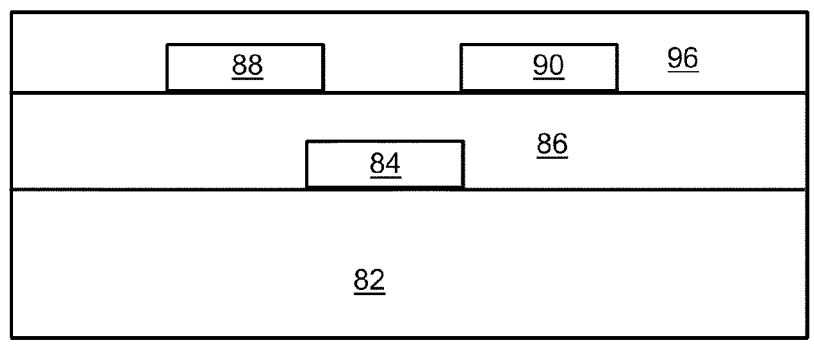
FIG. 14 is a schematic illustration of a thin film transistor device, according to some embodiments of the present invention.

FIG. 14 is a schematic illustration of a thin film transistor device 80, according to some embodiments of the present invention. Device 80 comprises of a substrate 82, in contact therewith a metal contact 84, which can serve as the gate electrode of device 80, and a gate dielectric layer 86. A source electrode 92 and a drain electrode 94 are deposited on layer 86. Over and between source 92 and drain 94 is a semiconductor layer 96 as illustrated in FIG. 14. In various exemplary embodiments of the invention semiconductor layer 86, comprises disk-shaped nanostructures as described above, preferably oriented with their so called "c-axis" perpendicular to dielectric layer 86 or substrate 13. In embodiments of the invention, this orientation refers to the crystalline nanostructures having a percentage P of x-ray diffraction intensity of the (002) peak relative to the sum of intensities of (100), (002), and (101) peak, where P is larger than about 40%, or larger than about 60%, or larger than about 80%.

The dielectric layer or substrate can have a surface which includes or is modified to include at least one type of polar functional group. The polar functional group further interacts with the nanostructures of the present embodiments and helps them self-assemble into a properly oriented semiconductor layer.

Semiconductor layer 86 can be made using a liquid deposition technique. The technique comprises depositing a composition comprising the nanostructures of the present embodiments over a dielectric layer, a substrate or other component of the TFT device, optionally heating at a temperature below the deformation temperature of the substrate, and optionally cooling. These steps may also be repeated to form a thicker semiconductor layer made up of several smaller sublayers.

Nanostructures which comprise a semiconductor material can also be incorporated according to some embodiments of the present invention in a liquid crystal composition. For example, a liquid crystal composition can comprise a solvent and semiconductor nanostructures in the solvent, wherein the solvent and the semiconductor nanostructures are in an effective amount in the liquid crystal composition to form a liquid crystalline phase.

As used herein, a "liquid crystalline phase" includes a phase that is intermediate to a liquid phase and a crystalline phase. In a liquid crystalline phase, the orientations of substantially all nanostructures are correlated to each other (e.g., the orientation of each individual nanostructure is affected and is affecting the orientation of the neighboring nanostructures), and the correlation extends to a large scale (e.g., equal to or larger than 1 micron) so that to a large scale the nanostructures are orientated uniformly unless disrupted by a local environment such as an impurity, non-uniformity on the container wall, etc. The orientation-correlation in the liquid crystals preferably allows controlling the orientations of the nanostructures with the aid of an electrical field, a magnetic field, or a pre-treated surface, such that the orientation can be switched or the unwanted effect of the local environment (e.g., impurities) can be diminished. This is unlike an isotropic phase where the orientations of nanostructures in solution are random.

The optical properties of the semiconductor nanostructures of the present embodiments (e.g., photoluminescence wavelengths produced thereby) can be tuned over the visible range by variation of the nanostructure size. Accordingly, by tuning the size of the semiconductor nanostructures, the liquid crystal compositions may emit different colors (i.e., different wavelengths of light). Since the semiconductor nanostructures according to some embodiments of the present invention are aligned, any light that is produced by the aligned semiconductor nanostructures can be polarized. Accordingly, embodiments of the invention can be used as polarized light sources.

The nanostructures of the present embodiments can also be combined with elongated nanostructures, such as nanotubes or nanowires of various materials, including, without limitation, electrically conductive materials and semiconductor materials, to provide a nanocomposite material. In this embodiments the nanostructures are substantially smaller in size than the elongated nanostructures. Preferably, the smaller size nanostructures are shaped generally as disks.

Such combination between elongated and smaller size nanostructures can be used as a cathode device, e.g., for a field emission device. The nanostructures in the nanocomposite material generally serve for suitably reducing the density of the elongated nanostructures so as to effectively enhance the field emission properties of the cathode, for example, when integrated into a field emission device. The smaller size nanostructures can be conductive, insulating or they can be made of semiconductor material. Also contemplated are combinations of several materials. The smaller size nanostructures function as a matrix material for the elongated nanostructures and effectively reduce the interaction between the nanostructures with a consequence of enhancing field emission properties. In some embodiments of the present invention, the particles may also function to trap or hold the elongated nanostructures onto a substrate or in a nanocomposite matrix.

Figure 15:
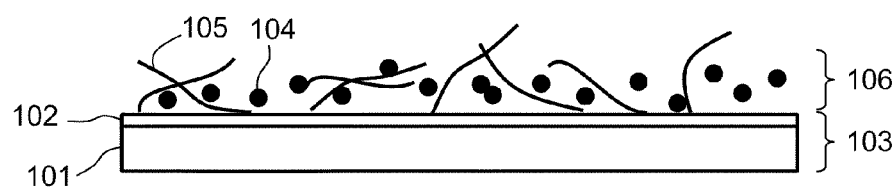
FIG. 15 is a schematic illustration of a cathode device, according to some embodiments of the present invention.

FIG. 15 is a schematic illustration of a cathode device 100, according to some embodiments of the present invention. Cathode device 100 comprises a substrate 103 on which a nanocomposite material 106 is in contact. Nanocomposite material 106 comprises elongated nanostructures 105 and smaller size nanostructures 104.

The term "elongated nanostructure" generally refers to a three-dimensional body made of a solid substance, in which one of its dimensions is at least 2 times, or at least 10 times, or at least 50 times e.g., at least 100 times larger than any of the other two dimensions. The largest dimension of the elongated solid structure is referred to herein as the longitudinal dimension or the length of the elongated nanostructure, and the other two dimensions are referred to herein as the transverse dimensions. The largest of the transverse dimensions is referred to herein as the diameter or width of the elongated nanostructure. The ratio between the length and the width of the nanostructure is known as the aspect ratio of the nanostructure.

In various exemplary embodiments of the invention the length of the elongated nanostructure is at least 100 nm, or at least 500 nm, or at least 1 μm, or at least 2 μm, or at least 3 μm, e.g., about 4 μm, or more.

The elongated nanostructures of the present embodiments can be of any type known in the art, provided their diameter is in the sub-micron scale and that they are generally perpendicular with respect to the surface. The elongated nanostructures can be nanowires, in which case they can have a solid elongated structure (namely non-hollow structure), or they can be nanotubes, in which case they can have an elongated hollow structure.

The elongated nanostructures can also have a core-shell structure. This structure can be embodied in two ways.

In some embodiments, the structure which provides the core-shell nanostructure with its mechanical strength is the shell. In these embodiments the nanostructures are nanotubes with internal cavity that is filled with a filler material, such as, but not limited to, a conducting material, a semiconductor material, a thermoelectric material, a magnetic material (paramagnetic, ferromagnetic or diamagnetic), a light-emitting material, a biomineral, a polymer and/or an organic material. The filler material can be either in a condensed or in a gaseous state.

In some embodiments, the structure which provides the core-shell nanostructure with its mechanical strength is the core. In these embodiments the nanostructure are nanowires coated by a coating material which can also be conducting, semiconducting, thermoelectric, magnetic, light-emitting, biomineral, polymer and/or organic.

The elongated nanostructures of the present embodiments can be made from a material selected from one or more of a semiconductor, a metal and a nonmetal.

The elongated nanostructures of the present embodiments can also be fullerene carbon nanotubes, either single-walled nanotubes (SWNT), which are can be considered as long wrapped graphene sheets, or multi walled nanotubes (MWNT) which can be considered as a collection of concentric SWNTs with different diameters. A typical diameter of a SWNT is less of the order of a few nanometers and a typical diameter of a MWNT is of the order of a few tens to several hundreds of nanometers.

The elongated nanostructures of the present embodiments can also be elongated organic nanostructures.

The phrase "organic nanostructure" refers to a nanostructure made at least in part of organic substance. As used herein, the phrase "organic substance" describes any substance that comprises carbon and hydrogen atoms, with or without additional elements.

One example of an organic nanostructure is a peptide nanostructure.

The term "peptide" as used herein encompasses native peptides (either degradation products, synthetically synthesized peptides or recombinant peptides) and peptidomimetics (typically, synthetically synthesized peptides), as well as peptoids and semipeptoids which are peptide analogs, which may have, for example, modifications rendering the peptides more stable while in a body.

Representative and non-limiting examples of elongated peptide nanostructures suitable for the present embodiment are found in International Patent Publication No. WO2008/068752, the contents of which are hereby incorporated by reference.

The largest dimension of the smaller size nanostructures is, on the average, less than 10%, or less than 5% or less than 1% of the length of the elongated nanostructures.

In some embodiments, substrate 103 comprises a base 101, which can be made of any material such as glass, and a conductive layer 102 which is supported by base 101.

Cathode device 100 can be incorporated in a field emission device. For example, a field emission device according to some embodiments of the present invention can comprise cathode device 100 and an additional electrode serving as an anode device. When an electrical field is formed between the cathode device and the anode device, electrons are extracted from the cathode device by tunneling through the surface potential barrier in the elongated nanostructures. Once emitted, the electrons can be accelerated, redirected and focused so as to energetically excite atoms of a specific material. Such field emission device can be integrated in many types of apparatus, such as, but not limited to, a field emitter display.

Figure 16:
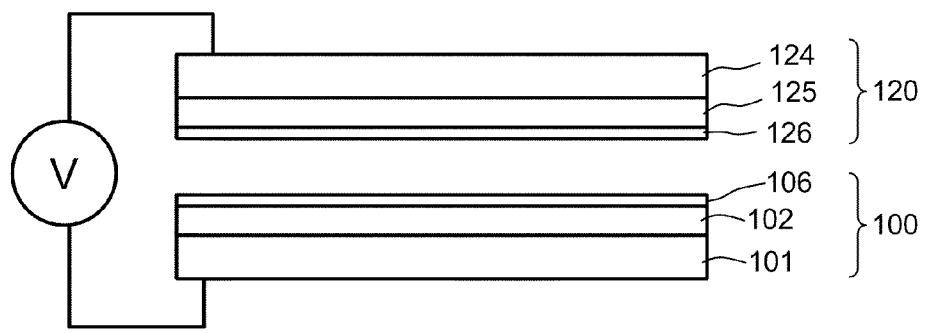
FIG. 16 is a schematic illustration of field emission display device, according to some embodiments of the present invention.

FIG. 16 is a schematic illustration of field emission display device 200, according to some embodiments of the present invention. Device 200 comprises cathode device 100 as further detailed hereinabove and an anode device 120. Anode device 120 can comprise a substrate 124, which may be a glass substrate, a conductive layer 125, which may be ITO or any other suitable material, and a phosphor layer 126 for receiving electrons emitted from nanocomposite material 106. Electrons are emitted from layer material 106 in response to an appropriate electric field between the anode and the cathode. It is appreciated that FIG. 16 shows a simplified view of a display. Not shown in the FIG. 16 are the side walls that complete the enclosure of the gap between the anode and cathode. Also not shown are spacers that hold the gap between the anode and the cathode. In normal operation, the gap between the anode and cathode is evacuated to pressures in the range of about $10^{-6}$ Torr or better vacuum. Many displays have many independently addressable lines on both the cathode and the anode in order to create pixels and thus form the image on the anode. FIG. 16 illustrates a diode display architecture. Other display architectures may have 3 (anode, cathode and grid) or more elements. In such cases, the addressing lines and columns are on the cathode and the grid; the anode is held at one potential An additional use of a field emission device according to some embodiments of the present invention is in the area of electron beam lithography, in particular when it is desired to achieve a precise critical dimension of order of a few tens of nanometers. The present embodiments successfully provide an apparatus for electron emission lithography apparatus, which comprises an electron emission source and an electrically conducting mounting device. The source can include one or more of the nanostructures of the present embodiments. The source and mounting device are preferably kept at a potential difference selected such that electrons are emitted from the source. A sample, on which an e-beam resist to be patterned is formed, is disposed on the mounting device, in a predetermined distance apart from the source. The electrons emitted from the nanostructures perform a lithography process on the sample. Subsequently, if a developing process is performed, portions of the resist which were exposed to the emitted electrons remain when the resist is negative, while portions of resist not exposed to an electron beam remain when the resist is positive, as known in the art.

The source and mounting device are preferably positioned in a magnetic field generated by a magnetic field generator. The magnetic field generator controls the magnetic field according to the distance between the nanostructures and the resist, so that the electrons emitted from the nanostructure reach the desired positions on the resist. Being charged particles moving in a magnetic field, the electrons are subjected to a magnetic force, perpendicular to their direction of motion (and to the direction of the magnetic field vector). Thus, a track of the movement of the electrons is controlled by the magnetic field generator, which redirects the electron to the desirable position. Consequently, the shape of the nanostructures can be projected upon the sample, to thereby perform a lithographic process thereon. As described above, according to the present embodiments, since the nanostructures are used as electron emission sources, a lithography process can be performed with a precise critical dimension.

The nanostructures of the present embodiments can also be used for reinforcing other materials, such as, but not limited to, polymers. Thus, according to yet an additional aspect of the present invention there is provided composition, in which a polymer is combined with the nanostructure of the present invention. Preferably, the nanostructure is chemically bonded to or integrated within the polymer chains via one or more chemical bond types.

Several attachment configurations can be utilized in order to reinforce polymer chains.

For example, the nanostructure can be linked to one or more chain-terminating group of the polymer chain or to residues of internal polymer groups. The polymer component of the composition of the present invention preferably comprises polymers, including copolymers, which are capable of chemically bonding with the peptides of the nanostructure, or those polymers that can be prepared from one or more monomer precursors capable of bonding with the peptides of the nanostructure either prior to or during polymerization. Representative examples of polymers which may be used include without limitation polyethylene glycol (PEG), polysaccharides, DNA, RNA, poly aminoacids, peptide nucleic acid (PNA).

The composition described above, can be used for manufacturing many forms of articles, such as filaments, carpets, ropes and the like.

A fiber can be formed from the polymer-nanostructure composition by cutting the composition into chips and drying. These chips can then be heated under pressure to bond the chips into a plug. This plug can then be heated to a molten state, passed through a mesh screen, and forced through an extrusion orifice. The filament formed by the molten composite material can then be pulled away from the orifice and wound onto a bobbin. Such fibers can be incorporated into bulked continuous filament, and made into carpets, ropes and the like.

Alternatively, the composition describe above can be used as an injection moldable resin for engineering polymers for use in many applications, such as, but not limited to, filters, solenoids and the like.

The nanostructure of the present invention can also be dispersed throughout a matrix material to thereby form a free-form structure. Constructing and arranging composite nodal elements to define a structure circumvents the common practice in the industry of post-fabrication processing operations. Initially, a structure is often fabricated in a mold or by machining and then subjected to post-fabrication processing operations. Post-fabrication processing operations refer to added steps required beyond initial fabrication so that the structure exhibits desired dimensions and tolerance. Typically, post-processing operations include for example, among others, machining, cleaning, polishing, grinding, deburring and hole drilling so as to achieve desired dimensions and tolerance of a fabricated structure.

In an additional embodiment of the present invention the nanostructures are used for the purpose of delivering energy from one location to the other.

In many industries, there is a great need for more efficient heat transfer fluids. Heat transfer fluids used in today's conventional thermal systems have inherently poor heat transfer properties. Often, millimeter- or micrometer-sized particles are suspended in heat transfer fluids so as to increase the capability of the fluid to deliver heat. The ratio of surface area to volume of the nanostructure of the present embodiments is about three orders of magnitudes larger than that of micrometer-sized particles. Since heat transfer occurs on the surface of a fluid, this feature of the present embodiments can be used for significantly enhancing heat conduction properties of cooling fluids.

Figure 17:
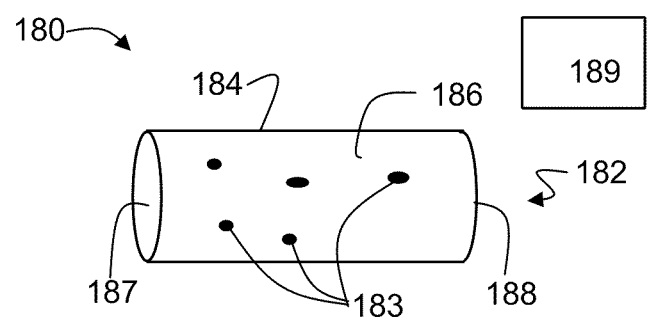
FIG. 17 is a schematic illustration of a heat transfer device, according to some embodiments of the present invention.

FIG. 17, is a schematic illustration of a heat transfer device 180, according to some embodiments of the present invention. Device 180 comprises a nanofluid 182 and a channel 184 for holding nanofluid 182. Nanofluid 182 comprises nanostructures 183, which can be any of the nanostructures described above, suspended in a fluid medium 186. Channel 184 is preferably constructed such that heat is transferred by nanofluid 182, and, in particular, by nanostructures 183, from a first end 187 to a second end 188 of channel 184.

Channel 184 is preferably in a micrometer size (i.e., a microchannel) or a nanometer size (i.e., a nanochannel), both are known in the art. In the embodiment in which channel 184 is a nanochannel, the diameter thereof is larger that the diameter of the largest nanostructure, so as to allow nanofluid 182 to flow freely through channel 184.

Device 180 may further comprise a fluid locomotion system 189 for generating locomotion of nanofluid 182 within channel 184. System 189 may operate in any way known in the art for generating locomotion of nanofluid 182. For example, in one embodiment, the locomotion of nanofluid 182 can be achieved by an under-pressure formed in channel 184, in which case system 189 generates underpressure. In another embodiment, fluid locomotion can be achieved by dielectrophoretic forces applied thereon, in which case system 189 can be realized, for example, as a mechanism for generating a non-uniform electric field.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

Instrumentation and Methodology:

A home-built Teflon three-electrode electrochemical cell was used. The template membrane with a thin (300 nm) layer of evaporated silver metal on one side served as the working electrode. The membrane was clamped between a nickel plate and a Teflon joint with an o-ring seal with the open-pore side of the membrane template facing the electroplating bath. Platinum wire and Ag/AgCl (3M NaCl) served as the counter and reference electrodes, respectively.

For the electrochemical procedures, controlled potentiostatic, galvanostatic and pulsed-current experiments were performed.

All magnetic measurements were performed with the use of a Quantum Design MPMS XL-superconducting quantum interference device (SQUID) magnetometer. The morphologies of the disk-like nanostructures were studied by a variety of scanning electron microscopies (SEM) including SEM (FEI QUANTA 200F) equipped with a secondary-electron detector, a backscattered-electron detector and energy-dispersive X-ray spectroscopy detector (EDS), which provided the compositions of the disk-like nanostructures. A Field-Emission Scanning Electron Microscope (FESEM) (JSM-6700F) was also employed.

Diffraction and STEM images were obtained using a Tecnai F20$^2$ Transmission Electron Microscope.

Evaporation was achieved with a thermal-evaporation unit (acquired from VST) equipped with a quartz-crystal monitor for characterizing film thickness.

Microcentrifugation was performed at 800 rpm (Hermle) to concentrate the rods and nanostructures.

Absorption spectra were recorded with an Agilent 8453 spectrophotometer.

An ultrasonic cleaner (Elmasonic S15H) was used for the redispersion of the nanostructure solutions, a Binder heating oven was used to dry membranes at 110° C., and a vortex mixer served to obtain homogeneous solutions.

Electrochemical Deposition:

Briefly, in a typical experiment, a thin layer of silver (300 nm) was deposited on one side of the membrane template by thermal evaporation. Next, the membrane was inserted into the electrochemical cell, and served as the working electrode for subsequent electrochemical deposition experiments. Generally, electrodeposition of different materials inside the pores was achieved by galvanostatic, potentiostatic, pulsed-current, or cyclic-voltammetry techniques. Prior to sacrificial copper electrodeposition, the cell was filled with deionized water (18.2 MΩ) for 5 minutes, to wet the pores of the filter. Later, the electrodeposition rates were empirically calibrated by measuring the length of the disk as a function of time and current density of the electrodeposition of different materials.

When performing sequential electrodeposition, the cell was thoroughly rinsed with deionized water between plating solutions, in order to remove the residues of the previous plating solution, and to prevent cross-contamination. On removing the membrane from the cell and rinsing it, the multi-segmented nanorods were revealed by dissolving the membrane in 2M NaOH for 30 minutes, followed by thorough washing with copious amounts of deionized water. Finally, 0.2 M diammonium persulfate ($(NH_4)_2S_2O_8$) was added for 20 minutes, to selectively etch the copper segment. As a result, the exposed multisegmented disk-like nanostructures were obtained on the silver backing surface or in solution.

Environmental Scanning Electron Microscopy (ESEM) Imaging and Energy Dispersive X-ray Spectroscopy (EDS) Analysis:

Imaging of Disk-Like Nanostructures Grown Inside an AAO Membrane:

A small portion of an AAO membrane containing the multisegmented structures was cut out and placed on a SEM stub (held by conductive carbon tape). The membrane was then dissolved by covering it with a drop of 2 M NaOH for 30 minutes, followed by thorough washing with copious amounts of de-ionized water. Finally, a drop of 0.2 M $(NH_4)_2S_2O_8$ was added in order to dissolve the sacrificial copper segments and release the multisegmented disk-like particles.

Multisegmented disk-like nanostructures were imaged with ESEM and HRSEM. The ESEM was equipped with a secondary-electron detector and a backscattered-electron detector. The alternating metal domains of the multisegmented metal disk-like nanostructures were clearly distinguishable as a result of the differences in intensity of the backscattered electrons from the different electroplated materials.

Imaging of Multisegmented Disk-Like Nanostructures on a Silicon Wafer:

The silver-backed film and alumina membrane (pore size 0.02 μm) were dissolved in concentrated nitric acid and 2 M sodium hydroxide solutions, respectively. The rods were collected from the solution inside an Eppendorf tube by centrifugation for 2 minutes at 800 rpm. Alternatively, rods containing magnetic segments can be easily separated from solution by placing a magnet under the Eppendorf tube. In both procedures, the supernatant was decanted and the wires were re-suspended by sonication in 1.5 ml ethanol. Decantation and suspension were repeated several times. Settling of the wires was observed, but sonication for 3 seconds followed by brief vortexing resulted in redispersion of the rods. A drop of the rod dispersion was placed on a silicon wafer and the ethanol was allowed to evaporate. The wafer was immersed in a solution of 0.2 M ammonium persulfate for 10 minutes, and finally rinsed with water. All the SEM measurements were performed at approximately 10 mm working distance and electron beam energy of 20 keV.

Imaging of Disk-Like Nanostructures Grown Inside a Polycarbonate Membrane:

The release of the Cu—Au nanorods was usually carried out by peeling the Ag film with tweezers. This was followed by dissolving the membrane in methylene chloride ($CH_2Cl_2$) for 5 minutes with only minor stirring. Nanorods were precipitated from the solution inside an Eppendorf tube by centrifugation for 2 minutes at 800 rpm, and were washed with a fresh solution of methylene chloride to remove all the polycarbonate. Next, the rods were deposited on a silicon wafer, and the wafer was immersed in water to remove all contamination. Finally, the copper segments were dissolved in 0.2 M diammonium persulfate solution to form the disk-like nanostructures of gold.

Example 1

Preparation of Gold (Au) Disk-Shaped Nanostructures Using AAO Template Membrane

An exemplary general synthetic process for the formation of single-component disk-like nanostructures is depicted in FIGS. 1A-E.

Gold disk-shaped nanostructures having a diameter which was predetermined by the nominal pore size of the chosen membrane were prepared. The preparation began with the formation of Cu—Au nanorods which were synthesized by sequential electrochemical deposition (the copper segments served as sacrificial material which can be readily removed later on by simple wet chemical etching).

An exemplary synthesis of a single component Au disk-shaped nanostructures was performed within the pores of an anodized aluminum oxide (AAO) membrane (nominal pore diameter=0.01 µm, thickness=about 60 µm, exposed area=1.5 $cm^2$, density=about $10^{10}$ pores/$cm^2$) backed with evaporated 300 nm of Ag. FIG. 1F presents top view SEM image of AAO template with an average diameter of 100 nm.

Figure 1E:
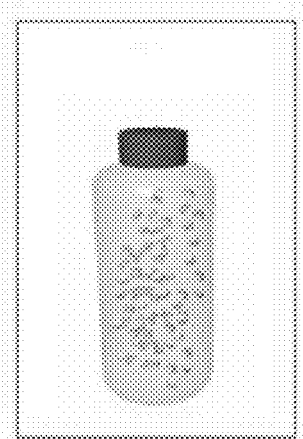

A thin layer of silver film (300 nm) was evaporated onto one face of the AAO template with a pore diameter of (0.01 µm) using thermal evaporation (FIG. 1A). Sequential electrodeposition of each of the different electrodeposition solutions of copper and gold respectively was then performed (FIG. 1B). The obtained nanorods were revealed by dissolving the membrane with 2 M NaOH for 30 minutes (FIG. 1C). Finally, 0.2 M of diammonium persulfate $(NH_4)_2S_2O_8$ was added for 20 minutes, which oxidized and decomposed the Cu segment, so as to obtain Au disk-like nanostructures on the Ag backing surface (FIG. 1D). Once formed, the obtained nanodisks can be placed in solution, as shown in FIG. 1E.

Figures 2A, 2B:
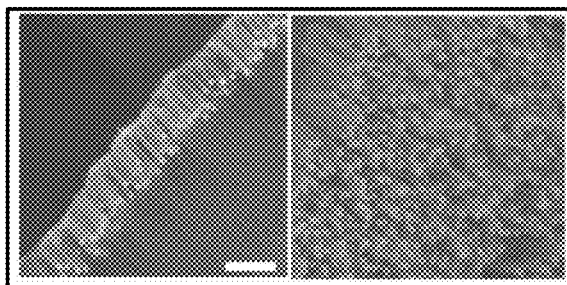
FIGS. 2A-F present a typical SEM image of Cu—Au nanodisks embedded in the nanochannels of an AAO template (scale bar: 1 μm) (FIG. 2A); a SEM image of freestanding Cu—Au nanodisk after removal of alumina template with 2M NaOH (FIG. 2B); SEM images demonstrating uniformity of morphology of Au disk-shaped nanostructures, after etching the membrane with NaOH and etching the copper sacrificial material by chemical oxidation with ammonium persulfate $(NH_4)_2S_2O_8$ (scale bar: 200 nm) (FIG. 2C), and close up images of Au disk-shaped nanostructures of 50 nm thickness and 100 nm diameter (scale bar: 50 nm) (Insets of FIG. 2C); a calibration graph of Au-disk thickness vs. time passed at a constant current of 0.40 mA (FIG. 2D), and a SEM image of Au disk segments of different thickness (L) obtained at different deposition times (Scale bar: 2 μm) (Inset of FIG. 2D); the corresponding energy-dispersive X-ray spectroscopy (EDS) of the Au disk-shaped segments of controlled thickness (FIG. 2E), and an STEM image of a 100 nm diameter single Au disk-like nanostructure and a diffraction pattern which shows the crystalline nature of the gold segment (Insets of FIG. 2E); and a top-view SEM images of anodized alumina membrane templates with different pores diameter: 30 nm (left), 100 nm (middle) and 200 nm (right) respectively (Scale bars: 50 nm, 250 nm and 500 nm, respectively) (FIG. 2F).
Figure 2C:
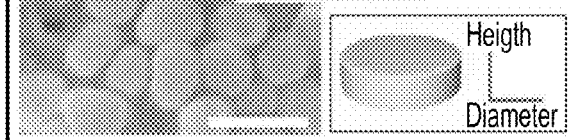

Thus, the resulting Cu—Au nanorods, shown in FIG. 2A, embedded in the AAO membrane, were released by etching the template with sodium hydroxide solution, as shown in FIG. 2B, followed by a thiol modification of the gold segments which stabilized the disk nanostructures and protected them from aggregation after the final sacrificial dissolution of the copper segments in diammonium persulfate. In FIG. 2C, the disk-shaped nanostructures obtained after dissolution of copper segments are shown.

FIG. 2A presents a typical SEM image of Cu—Au nanorods embedded in the nanochannels of an AAO membrane template having 0.02 µm nominal pore diameter (scale bar: 1 µm). FIG. 2B presents a SEM image of free-standing Cu—Au nanodisks after removal of the AAO template by etching with 2 M NaOH.

FIG. 2C presents SEM images demonstrating uniformity of morphology of Au disk-shaped nanostructures, after etching with NaOH, and chemical oxidation with ammonium persulfate $(NH_4)_2S_2O_8$, upon thiol modification (scale bar: 200 nm).

Figure 2D:
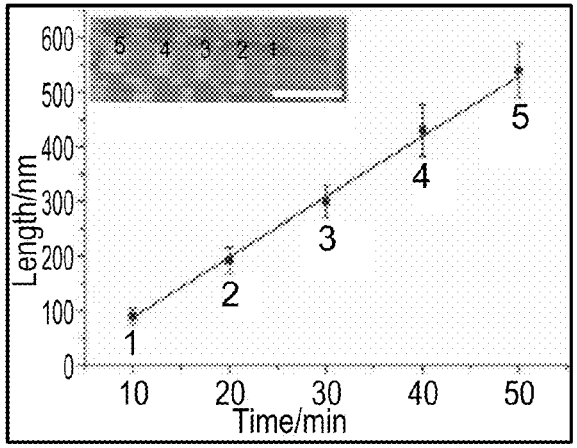
Figure 2E:
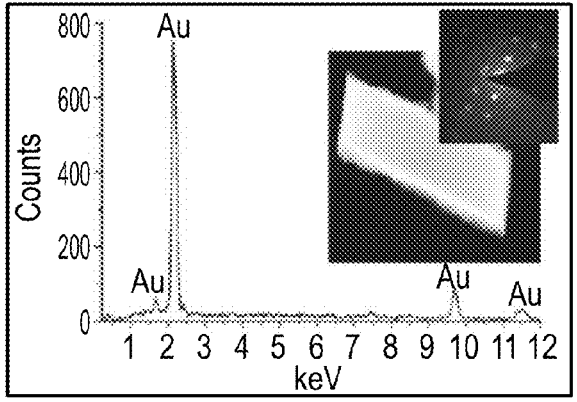

The insets in FIG. 2C show a close-up view of the constant morphology and surface of the gold disk-shaped nanostructures, while FIG. 2E provides the EDS elemental analysis of the nanostructures shown. The insets in FIG. 2E show an STEM image of a 100 nm diameter single Au disk-like nanostructure and a diffraction pattern which shows that the gold is crystalline.

In order to obtain gold segments of the desired size, a calibration graph of thickness (L) vs time at a constant charge of 0.40 mA passed through the alumina membrane was determined, as shown in FIG. 2D. Thus, the dimensions of the obtained metal nanodisks depend on the pore diameter of the given template and the time and charge of the electrodeposition.

FIG. 2D presents a calibration graph of Au-disk thickness vs. time passed at a constant current of 0.40 mA (FIG. 2D); Inset: SEM image of Au disk segments of different thickness (L) obtained at different deposition times.

Figure 2F:
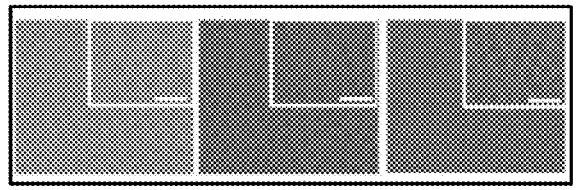

FIG. 2F presents top-view SEM images of anodized alumina membrane templates with different pores diameter: 30 nm (left), 100 nm (middle) and 200 nm (right) respectively (Scale bars: 50 nm, 250 nm and 500 nm, respectively). As shown in FIG. 2F, the diameter of the nanodisks can be controlled by the pore size of the template membrane used.

A controlled reduction in the diameter of the membrane template pores was achieved by deposition of alumina on the pore walls, according to a procedure described in Miikkulainen et al. [*Langmuir.* 2008, 24, 4473-4477].

Deposition of alumina can be performed using Atomic Layer Deposition (ALD), a coating process capable of depositing ultra-thin conformal films of a variety of materials. This approach allows performing ultra-fine tuning of the pore diameter with high accuracy (data not shown).

Thus, the proposed approach allows to readily prepare nanostructures of the desired dimensions, with full control over the thickness (L) and the diameter (D) of the nanodisks. In addition, the pore diameter of the AAO membrane template can be controlled during the anodizing drilling of the aluminum substrate. Pores between 20-200 nm can be readily prepared by simply changing the anodization conditions of the drilling step and post-anodization chemical etching.

Example 2

Figure 3A:
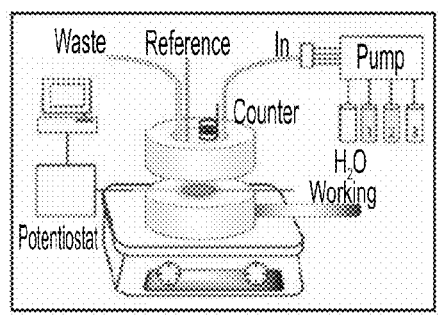
FIGS. 3A-D present a flow-controlled electrochemical cell setup used to perform the sequential electrodeposition and washing steps, according to some embodiments of the invention (FIG. 3A); an illustration of a high-throughput disks synthesis according to exemplary embodiments of the invention (scale bar: 1 μm) (FIG. 3B), and a close up SEM image of the enormous amount of single component gold disk-like nanostructures prepared in a single membrane template by multiple deposition steps (Inset of FIG. 3B); a schematic illustration of a high throughput platform synthesis of Au disk-like nanostructures and images of corresponding Au nanosegmented disks solutions with density of about 1.5, 7.5, $12*10^{10}$ disks/$cm^2$, obtained after the sacrificial copper dissolution reaction with ammonium persulfate where each exhibits a different characteristic color (FIG. 3C); and experimental absorption spectra of increasing concentrations of Au-disk-like nanostructures with an aspect ratio (thickness/diameter) of 0.32 in aqueous solutions (FIG. 3D).
Figure 3B:
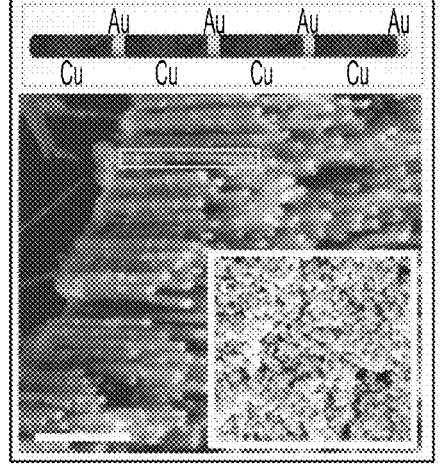
Figure 3C:
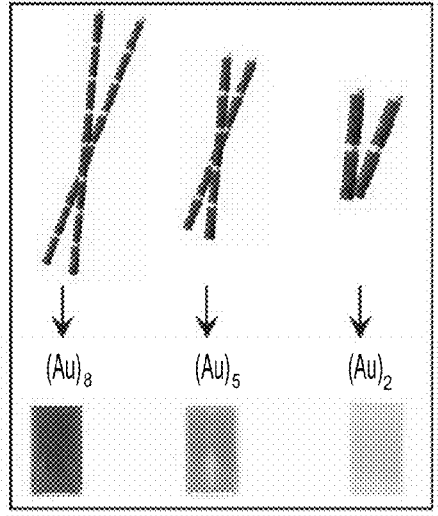

Preparation of Gold (Au) Disk-Shaped Nanostructures via Multi-Segmented Nanorods A high-throughput set-up platform synthesis of nanostructures was achieved with a simple replication of the gold-disk and copper sacrificial segments, as shown in FIGS. 3A and 3B. Solutions containing gold nanodisks with concentrations of about 1.5, 7.5, 12×$10^{10}$ disks/$cm^2$ were prepared in which each solution exhibits a characteristic appearance as shown in FIG. 3C bottom.

Accordingly, sequential electrodeposition of copper and gold was performed repeatedly.

FIG. 3A presents a flow-controlled electrochemical cell setup used to perform the sequential electrodeposition and washing steps.

FIG. 3B is an illustration of the high-throughput disks synthesis (scale bar: 1 µm); Inset: Close up SEM image of the enormous amount of single component gold disk-like nanostructures prepared in a single membrane template by multiple deposition steps.

FIG. 3C presents high throughput platform synthesis of Au disk-like nanostructures achieved after the sacrificial copper dissolution reaction with ammonium persulfate of Au nanosegmented disks solutions with density of about 1.5, 7.5, 12*10$^{10}$ disks/cm$^2$, where each exhibits a different characteristic color.

Example 3

Optical Properties of Gold Disk-Shaped Nanostructures

The optical properties of the gold disk-like nanostructures presented herein have also been characterized. These are important in cases where metal nanostructures which possess unique electronic, catalytic and detection properties are utilized. For example, at present, most applications of gold nanostructures as sensors are based on the detection of the wavelength shift in the surface plasmon band (SPB) [El-Sayed, M. A. Acc. Chem. Res. 2001, 34, 257-264], which is due either to a change in the local dielectric constant of the nanostructures resulting from adsorbed biomolecules, or to biomolecule-induced aggregation of the nanostructures [Elghanian, R.; Storhoff, J. J.; Mucic, R. C.; Letsinger, R. L.; Mirkin, C. A. Science. 1997, 277, 1078-1081].

The optical properties of well-defined shape-controlled metallic nanostructures as described herein enable manipulation of light at the nanoscale level. For example, optical tuning can be specifically controlled by the shape and size of the nanocrystals. When excited with an electromagnetic field, noble-metal nanostructures produce an intense absorption band known as a surface plasmon surface band (SPB) attributed to the collective oscillation of conduction electrons on the particle surface. The resonant frequency of the localized surface plasmon band (LSPB) is highly dependent on particle size, shape, material and environment [Tao, A. R.; Habas, S.; Yang, P. Small. 2008, 4, 310-325.

Figure 3D:
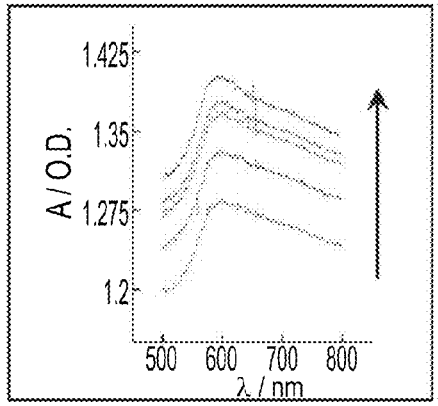

To this end, gold disk-like segments were treated with a 1:1 mixture of 20 mM sodium 3-mercapto-1-propanesulfonate (MPA), and 20 mM mercaptopropionic acid (MPSA), in aqueous solution. As a result of this modification, a negatively charged monolayer of MPA and MPSA is bound to the surface gold atoms via metal-thiol bonds and provides a negative surface charge when dispersed in an aqueous medium. Absorption spectroscopy measurements reveal a unique spectrum for these disk-like gold nanostructures, as displayed in FIG. 3D. Absorption spectra similar to those observed from gold nanodisk structures were recently reported for similar gold island nanostructures.

Example 4

Preparation of Gold (Au) Disk-Shaped Nanostructures Using PC Template Membrane

Reducing the particle size considerably, while maintaining the disk-like structure, was performed by the simple substitution of AAO by polycarbonate (PC) membranes as template. Since in the PC template the pores are more cylindrical than hexagonal, this has a direct effect on the morphology of the disk-like nanostructures.

In a typical experiment, similar to the process for the AAO membrane described hereinabove, nanorods were synthesized in the nanoporous "mold" by sequential electrodeposition. However, the electroplating conditions were slightly adjusted since the pore diameter is smaller, and the nature of the membrane is different. The preparation of gold disk-shaped nanostructures within the pores of PC membranes was performed as depicted in FIG. 1, with minor changes for the extraction of the nanostructures from the pores.

The main difference between the two types of membrane is in the etching process. While the etching of AAO membrane is performed with sodium hydroxide, the PC membrane is dissolved in methylene chloride.

Figure 4:
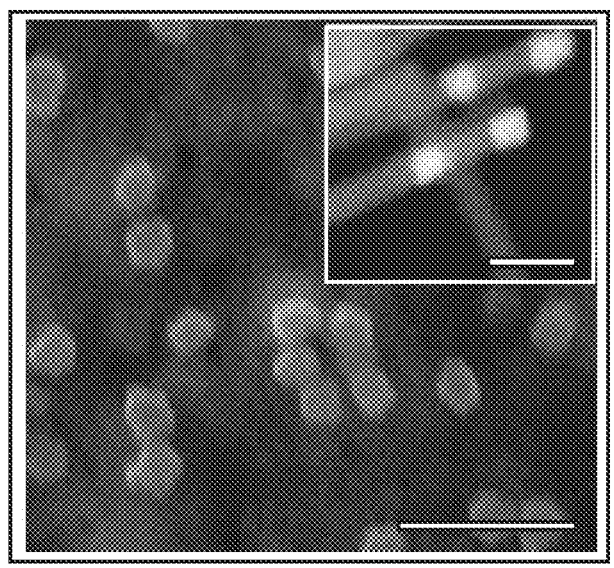
FIG. 4 presents a SEM cross-section image of about 30 nm thickness Au disk-like nanostructures synthesized inside a 15 nm polycarbonate template membrane, according to some embodiments of the invention (Scale bar: 60 nm), and a close-up SEM image of four-block di-segmented Cu—Au rods before dissolution of the sacrificial copper segments (Scale bar: 40 nm) (inset).

FIG. 4 presents a SEM cross-section image of about 30 nm thickness Au disk-shaped nanostructures synthesized inside a 15 nm polycarbonate template membrane. Scale bar: 60 nm. A close-up image of the gold disk-like domains at the end of the rods before the chemical dissolution of copper takes place is shown.

The inset in FIG. 4 shows a close up SEM image of free-standing four-block di-segmented Cu—Au nanorods after the membrane etching process and before dissolution of the sacrificial copper segments.

The final copper-oxidation step takes place and results in the formation of gold disk-like nanostructures as seen in FIG. 4. The obtained nanodisks are 15 nm in diameter and about 30 nm in thickness only. This clearly shows the nanostructure dimensions flexibility achieved by the methodology described herein.

Example 5

Figure 5A:
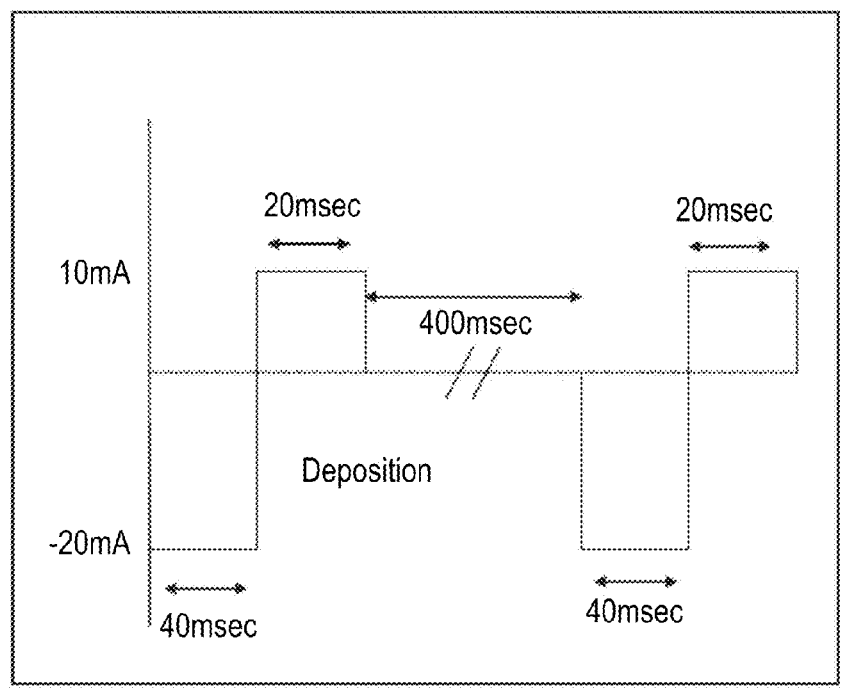
FIGS. 5A-C present a schematic illustration of the current pulse applied during electrodeposition, according to some embodiments of the invention (FIG. 5A); a SEM image of alternating thickness of Au disk-shaped nanostructures which are separated by a copper sacrificial layer at different deposition times using the current pulse technique (Scale bar: 700 nm) (FIG. 5B), and a close-up SEM image which shows how extremely low aspect ratios of the Au disk can be achieved at a short time using the pulse deposition approach, with the distance between the white arrows being about 4-5 nm (Inset); and an Au calibration curve of nanodisks' thickness vs. deposition time obtained by the current-pulse approach (FIG. 5C), and a SEM image showing the smooth surface morphology obtained by the current-pulse approach (Scale bar: 200 nm) (Inset).

Preparation of Disk-Shaped Nanostructures having Reduced Thickness, Via Pulsed-Current Electrochemistry A significantly reduced thickness in the disk-like nanostructures can be achieved through the use of pulsed-current electrochemistry. FIG. 5A describes a square-wave pulsed-current sequence which shows that deposition occurs at a strong negative pulse, whereas a positive pulse is applied to ensure that there is no further reduction process. The dead time allows the ion concentration to recover before the next pulse is applied, thus enabling the ions to reach steady state before the next pulse.

Introducing a delay time, $t_{off}$, of 0.4 seconds was sufficient to ensure restoration of a high gold-ion concentration at the pore bottom before the subsequent deposition pulse was applied.

In principle, the pulsed technique enables ultra-fine control over the charge passed through the cathode (working electrode) which determines the thickness of the disk-like nanostructures with almost monolayer or atomic precision.

FIG. 5A presents schematic view of current pulse applied during electrodeposition. First a current-limited negative pulse $t_{pulse}$ is applied to deposit Au. Then a positive pulse is applied in order to make sure that there is no reduction process further occurring. The cycle is repeated after $t_{off}$ in order to avoid depletion of metals ions near the deposition interface and to allow time for the ions to reach steady state.

Figure 5B:
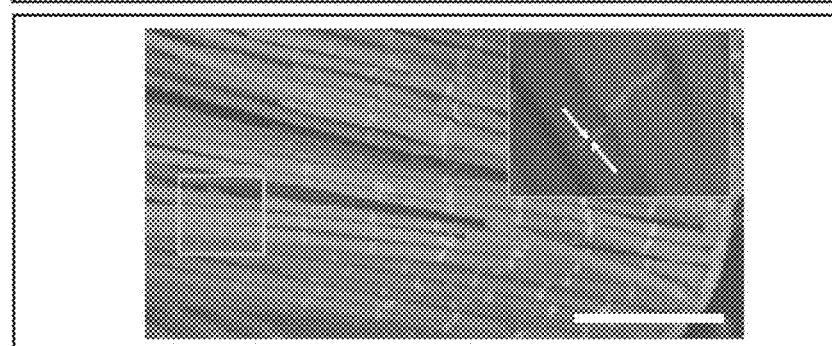

FIG. 5B is a SEM image of alternating thickness of the Au disk like shape which are separated by the copper sacrificial layer at different deposition time using the pulse technique. Scale bar: 700 nm. Shown in the Inset is a close up SEM image which shows how extremely low aspect ratios of the Au disk can be achieved at a short time using the pulse deposition approach. The distance between the white arrows is about 4-5 nm.

Figure 5C:
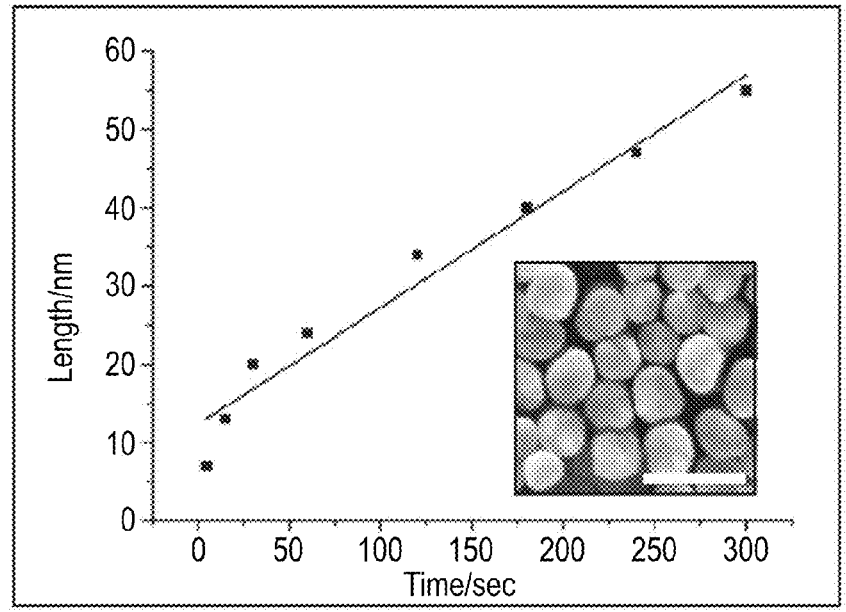

FIG. 5C is Au calibration curve of nanodisks thickness vs. deposition time obtained by the current-pulse approach; Shown in the inset is a SEM image showing the smooth surface morphology obtained by the current-pulsed approach. Scale bar: 200 nm.

Clearly, as shown in FIGS. 5B and 5C, nanodisks of extremely low aspect ratio, less than 5 nanometers in thickness, are readily obtained. Moreover, a precise, smoother surface of the disk-like nanostructures can be achieved as well, as shown in FIG. 5C inset.

Generally, for obtaining an extremely low aspect ratio for the disk-like nanostructures, the pulsed technique is a reliable and controllable and hence preferred to this effect. In addition, the pulsed-current technique compensates for the slow diffusion-driven transport in the hydrophobic small diameter pores of the polycarbonate membrane.

Example 6

Synthesis of Metallic Di-Segmented Au—Ni Disk-Like Nanostructures

Bimetallic nanostructures can be obtained as alloy or core/shell particles to provide the freedom required for proper tuning according to the needs of the intended application. Alloy nanostructures are often produced by the simultaneous reduction of two metal ions [see, for example, Gill, R.; Freeman, R.; Xu, J. P.; Willner, I.; Winograd, S.; Shweky, I.; Banin, U. *J. Am. Chem. Soc.* 2006, 128, 15376-15377; Link, S.; Wang, Z. L.; El-Sayed, M. A. *J. Phys. Chem. B.* 1999, 103, 3529-3533], while the growth of the core-shell structure can be accomplished by the successive reduction of one metal ion over the core of the other metal [Aharoni, A.; Mokari, T.; Popov, I.; Banin, U. *J. Am. Chem. Soc.* 2006, 128, 257-264].

The methodology described herein can be further used for preparing second-generation nanostructures which consist of di-segmented disk-like nanostructures.

To this end, metals which possess unique properties can be used. In one example, a gold segment which offers excellent conductivity and also serves as a platform for binding biological elements such as DNA and antibodies through thiol chemistry, and a ferromagnetic nickel segment which can impart magnetic properties to the nanostructures under a magnetic field, were selected. Such a combination enables easy manipulation for using these nanostructures as a platform for separation techniques.

The formation of di-segmented disk-like nanostructure-architecture is followed by a procedure similar to that shown in FIG. 1, with minor changes. Briefly, in the synthesis of the di-segmented disk-like nanostructures, a one-step electrodeposition of sacrificial copper is performed, followed by sequential electrodeposition of gold (0.39 mA/cm$^2$ for 17 minutes) and nickel (4 mA/cm$^2$ for 2.5 minutes) under galvanostatic or current-pulse conditions, depending on the required disk dimensions, by tuning the amount of charge that passes through the working electrode, and ending with membrane etching in 2 M NaOH and sacrificial copper-domain dissolution in 0.2 M ammonium persulfate. Di-segmented-disk-like nanostructures are thus obtained.

Figure 6A:
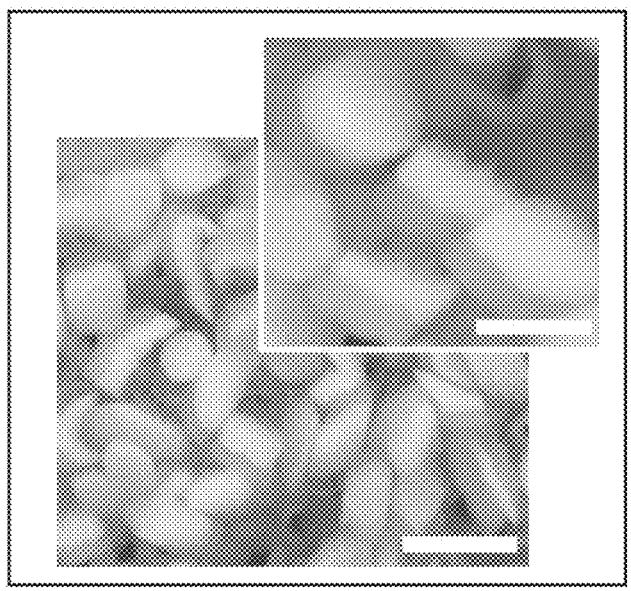
FIGS. 6A-C present a backscattering electron SEM image of di-segmented Au—Ni disk-like nanostructures according to exemplary embodiments of the invention (Scale bar: 200 nm) (FIG. 6A), and a close up SEM view of the di-segmented Au—Ni disk like nanostructures (Scale bar: 100 nm) (Inset); an energy-dispersive X-ray spectroscopy (EDS) of Ni and Au domains (FIG. 6B), a backscattering electron SEM image of single di-segmented (Au-50 nm)/(Ni-40 nm) disk-like nanostructures, with a diameter of approximately 100 nm (top inset), and an STEM image of a single 100 nm di-segmented Au—Ni disk-like nanostructure (bottom inset); and SEM images of smooth ultra-thin Au/Ni nanostructures obtained by the current-pulse technique (FIG. 6C, left), disks of 0.2 aspect ratio (scale bar: 50 nm) (FIG. 6C, inset) and disks of 0.05 aspect ratio (scale bar: 20 nm) (FIG. 6C, right).
Figure 6B:
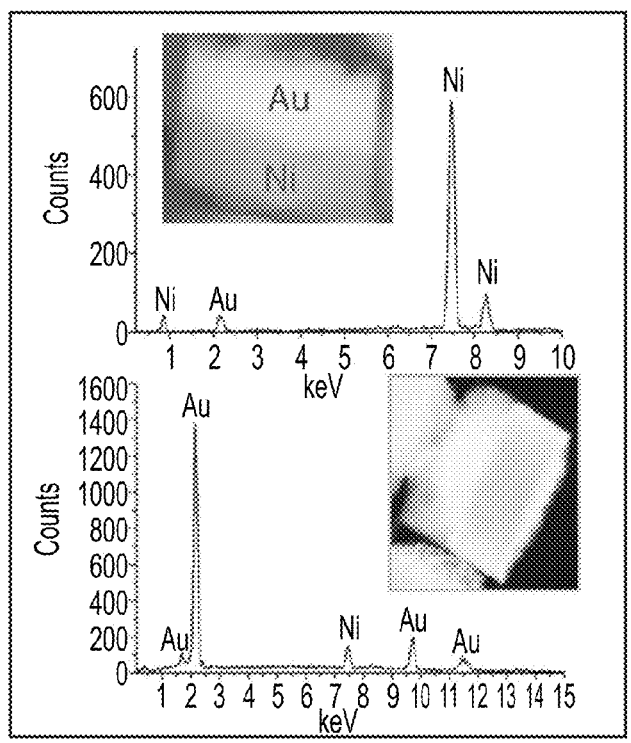

SEM images of a single di-segmented Au—Ni disk-like nanostructures are shown in FIGS. 6A and 6A inset. A collection of Au—Ni disk-like nanostructures demonstrates uniformity in the production of the resulting disk-like nanostructures. energy-dispersive X-ray spectroscopy (EDS) was performed and the presence of the nickel and gold segments was confirmed, as shown in FIG. 6B. FIG. 6B bottom inset shows an STEM image of a single 100 nm diameter di-segmented Au—Ni disk like nanostructure. The diffraction pattern reveals that also the Ni segment grows crystalline (data not shown).

One of the advantages of the methodology described herein is illustrated by the multifunctionality of the obtained nanostructures and by the ability for produce tailor-made nanostructures according to the required application.

Figure 6C:
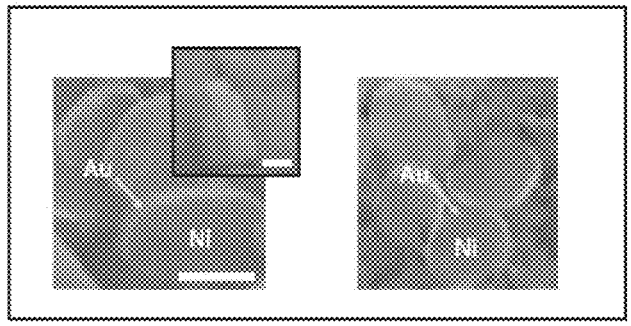

For example, the magnetic feature of di-segmented-Au—Ni disk-like nanostructures can be implemented in certain applications, but after achieving their purpose, and should the nickel part no longer be needed, segment-selective chemical etching with $FeCl_3.6H_2O$ can be carried out, to dissolve the nickel domain, leaving only the gold disk-like nanostructures (data not shown). The di-segmented-Ni—Au disk-like nanostructures can also be synthesized with very small aspect ratios, with very thin nickel and gold segments, as shown in FIG. 6C and inset.

Figure 10A:
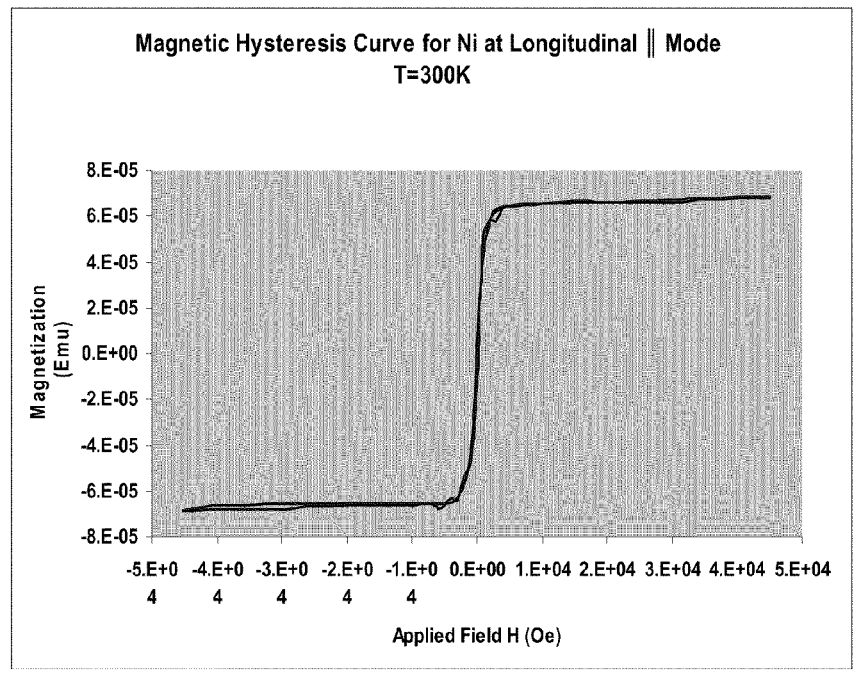
FIGS. 10A-B show SQUID magnetization hysteresis loops for a nickel segment (about 200 nm) measured with an applied field parallel and perpendicular to the surface axis, respectively, and illustrating that saturation is achieved extremely quickly at a relatively low applied field.
Figure 10B:
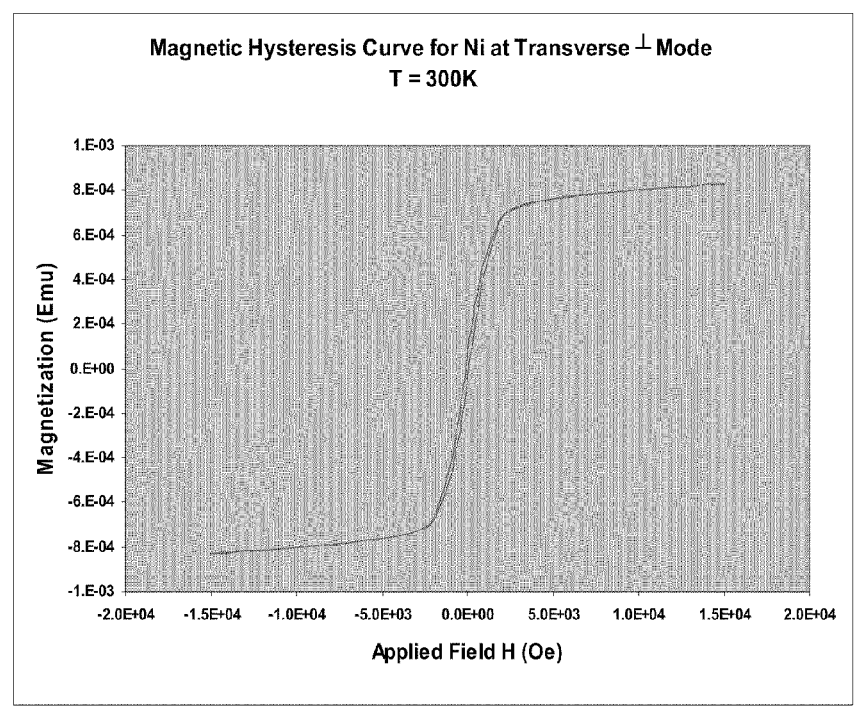

Magnetization hysteresis loops within multi-segmented nanostructures were measured with a SQUID (Superconducting Quantum Interference Device) magnetometer (Quantum Design MPMS XL-5). The results are presented in FIGS. 10A and 10B, which illustrate that saturation is achieved extremely quickly at a relatively low applied field.

Example 7

Metallic Multisegmented Au—Ni—Pt Disk-Like Nanostructures

The methodology described herein can further be used for preparing multi-segmented nanostructures. Obtaining Au—Ni—Pt disk-like multisegmented nanostructures where each segment of the nanostructures possesses unique physical and chemical properties could provide diversity and multifunctionality of the novel hybrid building blocks. This multifunctionality allows these hybrid nanostructures to perform several tasks simultaneously.

FIG. 7A sketches an exemplary, general procedure for the preparation of Au—Ni—Pt multisegmented disk-like nanostructures, by the sequential deposition of material into nanoporous (e.g., AAO, Polycarbonate) templates. Electrodeposition of alternating electrolytes containing Au, Ni, and Pt was carried out sequentially, followed by wet chemical etching of the membrane and sacrificial copper layer which led to the multisegmented disk nanostructures.

In an exemplary procedure, sacrificial-copper electrodeposition took place at –0.42V (vs. Ag/AgCl), for 10 minutes, to fill the pores inside an AAO template membrane. An extra advantage of the electrodeposition of copper as a first step is that the pores fill uniformly. Then, electrodeposition of gold, nickel and platinum was carried out sequentially to obtain the desired pattern of the multisegmented disk-like nanostructures. This was performed by empirically tuning the time and current density of each deposition step. Dissolution of the membrane and sacrificial-copper segments results in the formation of the multisegmented disk-like nanostructures.

Figure 7B:
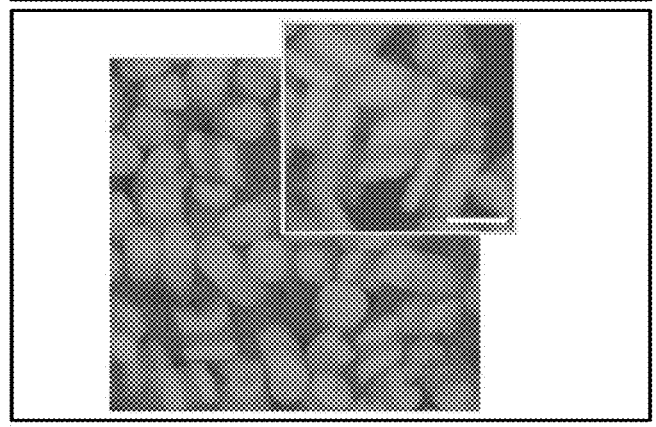
Figure 7C:
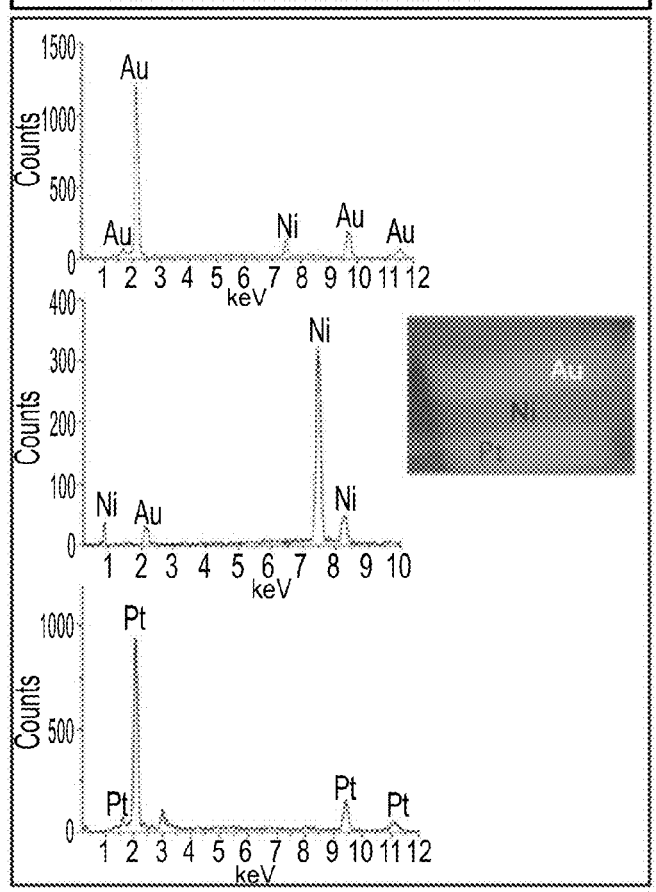

The physical dimensions and morphology of the multi-segmented disk-like nanostructures were measured by SEM as shown in FIGS. 7B and 7B inset. Further chemical analysis of the Au—Ni—Pt disk-like nanostructures performed by EDS reveals the composition of each of the segments of the multisegmented nanostructure, as shown in FIG. 7C.

FIG. 7B presents SEM image of multisegmented Au—Ni—Pt disk-like nanostructures respectively, which exhibits clear contrasts between the three different segments (bright Au ends, dark Ni, and bright Pt domain). A close-up SEM image of a collection of multisegmented Pt—Ni—Au disk-like nanostructures demonstrates the uniformity of the resulting disk-like nanostructures (FIG. 7B inset).

The electrochemical process described herein can be readily generalized for the preparation of other metal, semiconductor and polymer hybrid multicomponent disk-like nanostructures, as described herein.

In addition, alloy-disks of unlimited alloy composition can be readily synthesized by this methodology, a task which is difficult, if not impossible, to achieve by nanostructures conventional synthetic methods.

Thus, a methodology that utilizes template synthesis to form a novel family of nanoscale building blocks has been established. By this methodology, the production of different configurations of metal units that function as single segments within multisegmented metallic disk-like nanostructures is achieved. By controlling current density and deposition time, shape- and dimension-controlled nanostructures of defined chemical composition and morphology are obtained.

The disk-like nanostructures described herein can also be combined with other materials such as conducting polymer and semiconductors, as follows.

Example 8

Hybrid Metal/Conducting Polymer Di-Segmented, Au-Ppy, Disk-Like Nanostructures

Chemical template synthesis of a polymer is accomplished by immersing the template membrane into a solution containing the monomer and a polymerization-inducing reagent [Parthasarathy, R. V.; Martin, C. R. *Nature*. 1994, 369, 298-301]. This process has been used to produce a variety of conductive polymers within the template pores. Another method involves electropolymerization [Martin, C. R. *Science*. 1994, 266, 1961-1966; Martin, C. R. *Acc. Chem. Res*. 1995, 28, 61-68]. A number of unique 1-D high-aspect ratio nanostructures including bundles, rods and core-shell by using hybrid structures consisting of segments of conducting polymers and metals [Love, J. C.; Urbach, A. R.; Prentiss, M. G.; Whitesides, G. M. *J. Am. Chem. Soc*. 2003, 125, 12696-12697; Wang, J. G.; Tian, M. L.; Kumar, N.; Mallouk, T. E. *Nano. Lett*. 2005, 5, 1247-1253; Lahav, M.; Weiss, E. A.; Xu, Q.; Whitesides, G. M. *Nano. Lett*. 2006, 6, 2166-2171].

Figure 8C:
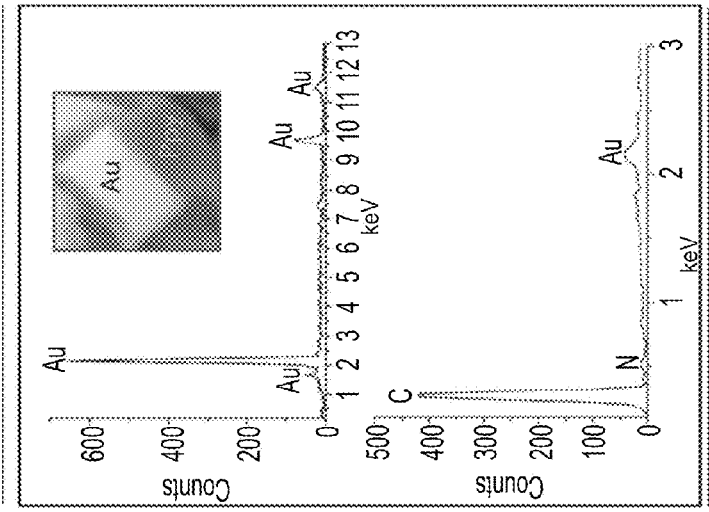
FIGS. 8A-D present SEM images of Polypyrrole (Ppy) and Polyaniline disk-like nanostructures of 100 nm diameter, according to some embodiments of the invention (FIG. 8A), and a larger scale magnification SEM images of the respective polymer nanodisks (top insets); a SEM image of hybrid metal/conducting polymer Au-Ppy disk-like nanostructures, according to some embodiments of the invention, after dissolution of the Cu sacrificial segments, revealing the uniformity of the method on the resulting disk-like nanostructures (Scale bar 120 nm) (FIG. 8B), a larger area magnification of the hybrid metal-polymer Au/Ppy nanodisks after deposition on a clean silicon wafer substrate (Scale bar: 120 nm) (top inset), and of a Ppy disk nanostructure on a silicon wafer after selective dissolution of gold segment, according to some embodiments of the invention (bottom inset); the energy-dispersive X-ray spectroscopy (EDS) of the Au-Ppy disk-like nanostructures (FIG. 8C), and a close-up SEM image of about 100 nm diameter Au-Ppy disk-like nanostructures (inset); and the absorption spectrum of Ppy-disk-like nanostructures (100 nm thickness/100 nm diameter) in methanol (FIG. 8D), and a dark-brown methanol solution consisting of Ppy nanodisks (inset).
Figure 8D:
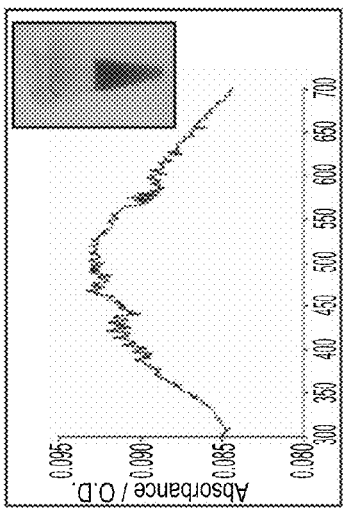
Figure 8A:
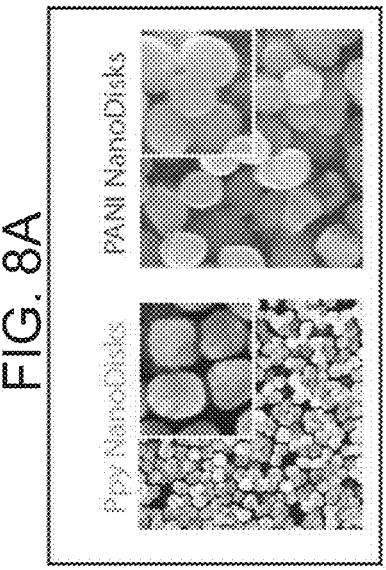

Discrete polymer nanodisks, according to embodiments of the invention, can be synthesized by the simple electropolymerization of the monomers, aniline and pyrrole (see, FIG. 8A).

Herein, novel hybrid inorganic-organic (metal/polymer) di-segmented nanostructures are presented. These are prepared by a methodology that involves the preparation of, for example, a gold/conducting polymer composite nanostructures similar to those illustrated in FIG. 7A. Briefly, sacrificial-copper segments were electrodeposited as described hereinabove, followed by sequential electrodeposition/electropolymerization of gold and polypyrrole (Ppy), or polyaniline (PANI), disk segments of the desired thickness.

FIG. 8A presents SEM images of Ppy and Polyaniline disk like nanostructures of 100 nm diameter. Larger scale magnification SEM images of the respective polymer nanodisks are presented in the insets.

Figure 8B:
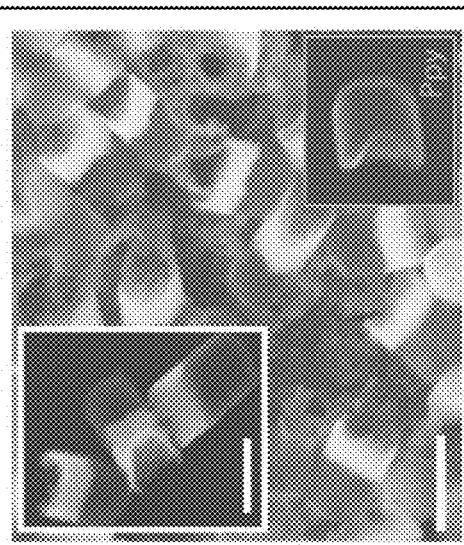

Dissolution of the membrane template and sacrificial-copper segments lead to free standing hybrid Au-Ppy di-segmented disk-like nanostructures, as shown in FIG. 8B and top inset. FIG. 8B presents a SEM image of hybrid metal/conducting-polymer Au-Ppy disk-like nanostructures, after dissolution of the Cu sacrificial segments, revealing the uniformity of the method on the resulting disk-like nanostructures. Larger area magnification of the hybrid Au/Ppy nanodisks after deposition on a clean silicon wafer substrate is shown in FIG. 8B, top inset. A Ppy disk nanostructure on a silicon wafer after selective dissolution of gold segment id shown in FIG. 8B, bottom inset.

At the gold/polymer interfaces a slight reduction in diameter was observed. This may have been caused by shrinking of the soft polymeric segments after the release of the di-segmented nanostructures from the membrane template. Further selective dissolution of the gold segments, (if required in particular applications), leads to a single segment of conductive polypyrrole, (see, FIG. 8B bottom inset).

EDS analysis, presented in FIG. 8C, showed the suggested chemical composition analysis for both segments. The UV-Vis absorbance spectrum of a solution of polypyrrole disk-like particles in ethanol, is presented in FIG. 8D, and shows a broad peak at about 480 nm, which confirms the presence of polypyrrole [Cheng, D.; Xia, H.; Chan, H. S. *Langmuir*. 2004, 20, 9909-9912].

In addition, bi-polymer PPy/PANI hybrid nanodisks were prepared (data not shown) with a controlled combination of both polymers.

The novel segmented metal-polymer nanostructures could be relevant to sensing or catalytic applications. For example, the polymeric component could be used for conjugating or trapping biomolecules or chemical species during electrochemical polymerization. For example, Ppy is an ideal electroactive polymer for drug-delivery applications as a result of its highly favorable biocompatibility. Also, these polymer-metal nanohybrid particles could find many applications, such as sensing experiments, drug delivery and photovoltaic devices.

Example 9

Metallic/Semiconductor Multisegmented Au—CdTe—Ni Disk-Like Nanostructures

A versatile technique for the production of multisegmented disk-like nanostructures, which incorporate semiconductor materials has also been developed. CdTe (II-VI group) has become one of the most attractive semiconductors because of its optimum energy-band gap ($E_g$=1.44 eV), high optical absorptivity, and photovoltaic properties, which are useful in solar-cell devices [Ferekides, C. S.; Balasubramanian, U.; Mamazza, R.; Viswanathan, V.; Zhao, H.; Morel, D. L. *Solar Energy*. 2004, 77, 823-830].

Multisegmented disk-like nanostructures comprising Ni—Au—CdTe were synthesized by sequential electrodeposition as described hereinabove. In synthesizing the semiconductor section, the ratio of Te to Cd is greatly influenced by the concentration of $HTeO_2^+$ ions. Specifically, the rate of tellurium deposition is proportional to $[HTeO_2^+]$ in solution and the rate of CdTe deposition is, in turn, limited by the deposition rate of tellurium [Danaher, W. J.; Lyons, L. E. *J. Electrochem. Soc*. 1984, 37, 689-672].

Figure 9A:
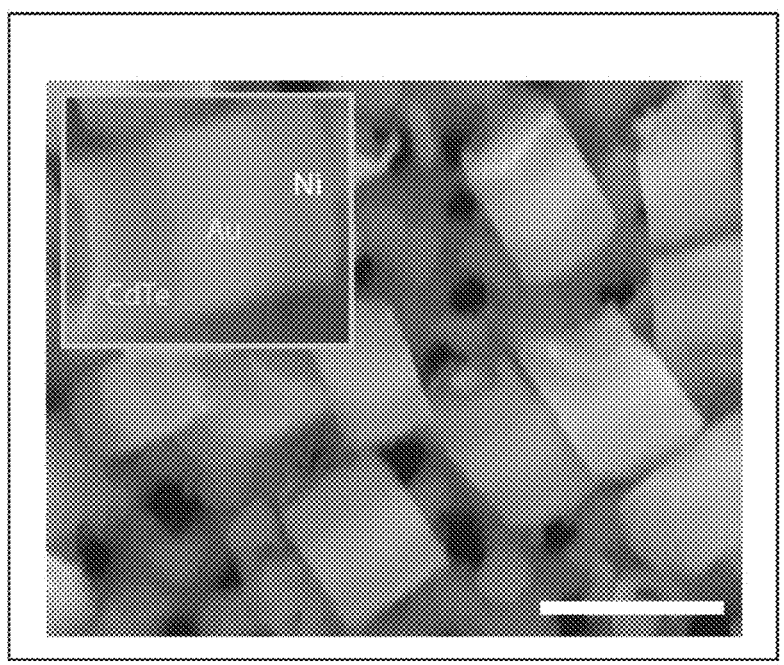
FIGS. 9A-B present a backscattered SEM image of a tri-segmented Ni—Au—CdTe disk-like nanostructures, according to some embodiments of the invention (Scale bar: 120 nm) (FIG. 9A), and a close-up SEM image of a single multi-segmented disk nanostructure (inset); and the EDS spectra of different segments along the tri-segmented disk-like nanostructures (FIG. 9B), and a close-up SEM image of an about 100 nm diameter tri-segment Ni—Au—CdTe disk-like nanostructure (Scale bar: 35 nm) (inset).
Figure 9B:
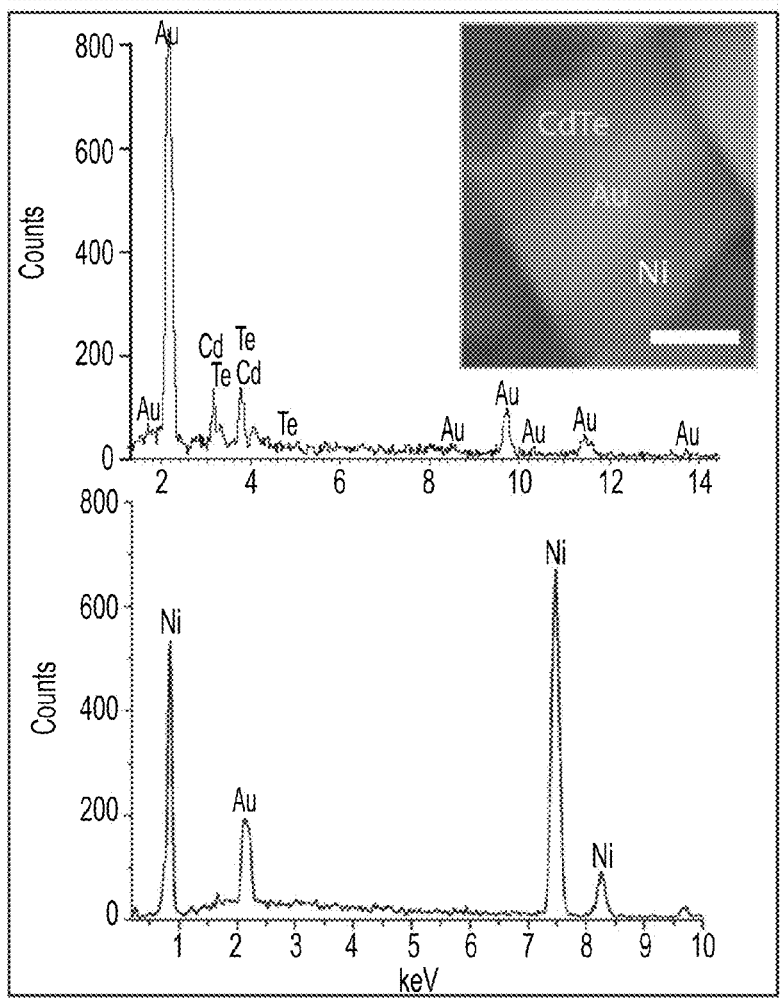

In brief, sacrificial copper is electrodeposited, as described, for example, in Example 7 hereinabove, followed by the sequential electrodeposition of gold, CdTe and nickel segments at 0.39 mA/cm$^2$, 0.90 mA/cm$^2$ and 4 mA/cm$^2$, respectively. The template membrane and copper segments are then dissolved, and free-standing multi-segmented disk-like nanostructures are obtained, as shown in FIG. 9A and FIG. 9B.

The obtained results demonstrate the ability to integrate semiconductor segments into the multi-segmented hybrid nanostructures. Thus, nanostructures combining multiple functions, e.g. magnetic, photoluminiscent and conductive properties, can be obtained by the methodologies described herein.

The photoluminescent properties of hybrid metal/semiconductor and polymer/semiconductor nanostructures can be utilized in a wide variety of applications.

The pre-programmed multifunctionality enables the hybrid disk-like nanostructures described herein to perform several tasks simultaneously. As a result, a variety of novel and exciting applications for the multicomponent disk-like nanostructures can be achieved in several interdisciplinary fields, such as, for example, the use of the novel hybrid nanostructures as contrast label agents in in vivo MRI imaging experiments, as detailed hereinabove.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES CITED BY NUMERALS

Other References are Cited in the Text

1. Chen, J.; Wiley, B. J.; Xia, Y. *Langmuir.* 2007, 23, 4120-4129.
2. Mieszawska, A. J.; Jalilian, R.; Sumanasekera, G. U.; Zamborini, F. P. *Small.* 2007, 3, 722-756.
3. Lahav, M.; Sehayek, T.; Vaskevich, A.; Rubinstein, I. *Angew. Chem. Int. Ed. Engl.* 2003, 42, 5576-5579.
4. Martin, C. R. *Electroanalytical Chemistry*, Vol. 21 (Eds.: A. J. Brd, I. Rubinstein), Marcel Dekker, New York 1999, 1-74.
5. John, C.; Martin, C. R. *J. Mater. Chem.* 1997, 7, 1075-1087.
6. Caruso, R. A.; Schattka, J. H.; Greiner, A. *Adv. Mater.* 2001, 13, 1577-1579.
7. Zhang, J.; Yan, Y.; Cao, X.; Zhang, L. *Appl. Opt.* 2006, 45, 297-304.
8. Mingzai, W.; Lianzeng, Y.; Weili, C.; Guowei, J.; Xiaoguang, L.; Zhen, Y. *J. Mater. Sci. Technol.* 2004, 20, 11-14.
9. Lakshmi, B. B.; Patrissi, C. J.; Martin, C. R. *Chem. Mater.* 1997, 9, 2544-2550.
10. Yi, G.; Schwarzacher, W. *Appl. Phys. Lett.* 1999, 74, 1746-1748.
11. AlMawlawi, D.; Coombs, N.; Moskovits, M. *J. Appl. Phys.* 1991, 70, 4421-4425.
12. Evans, P. R.; Yi, G.; Schwarzacher, W. *Appl. Phys. Lett.* 2000, 76, 481-483.
14. Bogart, T. E.; Dey, S.; Lew, K.-K.; Mohney, S. E.; Redwing, J. M. *Adv. Mater.* 2005, 17, 114-117.
15. Sklar, G. P.; Paramguru, K.; Misra, M.; LaCombe, J. C. *Nanotechnology* 2005, 16, 1265-1271.
16. Hurst, S. J.; Payne, E. K.; Qin, L.; Mirkin, C. A. *Angew. Chem. Int. Ed. Engl.* 2006, 45, 2672-2692.
17. Park, S.; Chung, S. W.; Mirkin, C. A. *J. Am. Chem. Soc.* 2004, 126, 11772-11773.
18. Kline, T. R.; Paxton, W. F.; Mallouk, T. E.; Sen, A. *Angew. Chem. Int. Ed Engl.* 2005, 44, 744-746.
19. Qin, L.; Banholzer, M. J.; Xu, X.; Huang, L.; Mirkin, C. A. *J. Am. Chem. Soc.* 2007, 129, 14870-14871.
20. Paxton, W. F.; Kistler, K. C.; Olmeda, C. C.; Sen, A.; St Angelo, S. K.; Cao, Y.; Mallouk, T. E.; Lammert, P. E.; Crespi, V. H. *J. Am. Chem. Soc.* 2004, 126, 13424-13431.
21. Nicewarner-Pena, S. R.; Freeman, R. G.; Reiss, B. D.; He, L.; Pena, D. J.; Walton, I. D.; Cromer, R.; Keating, C. D.; Natan, M. J. *Science.* 2001, 294, 137-141.
22. Salem, A. K.; Searson, P. C.; Leong, K. W. *Nat Mater.* 2003, 2, 668-671.
23. Yuan, X. Y.; Wu, G. S.; Xie, T.; Lin, Y.; Zhang, L. D. *Nanotechnology* 2004, 15, 59-61.
24. Wang, J.; Liu, G. *Anal Chem.* 2006, 78, 2461-2464.
25. Meenach, S. A.; Burdick, J.; Kunwar, A.; Wang, J. *Small.* 2007, 3, 239-243.
26. Nielsch, K.; Muller, F.; Li, A.; Gosele, U. *Adv. Mater.* 2000, 12, 582-586.
27. Vlad, A.; Matefi-Tempfli, M.; Antohe, V. A.; Faniel, S.; Reckinger, N.; Olbrechts, B.; Crahay, A.; Bayot, V.; Piraux, L.; Melinte, S.; Matefi-Tempfli, S. *Small.* 2008, 4, 557-560.

What is claimed is:

1. A process of preparing a plurality of nanostructures, each having a base surface and a top surface, and being composed of at least three different target materials arranged layerwise across a thickness direction thereof such that said layers are exposed at a periphery of said nanostructure between said base surface and said top surface, at least one of said target materials being an electropolymerized polymer or a semiconductor material selected from the group consisting of CdTe, CdS, CdSe, ZnS, ZnO, GaAs, ZnTe, CdTeSe, GaAs, gallium phosphide, gallium nitride, $TiO_2$, and $TiS_2$, wherein at least one of said nanostructures comprises a polyaniline segment and a polypyrrole segment, the process comprising:

depositing a blocking layer onto a first side of a porous membrane having pores of nanometric diameter, so as to substantially block said pores from said first side while leaving said pores open from a second side of said membrane;

sequentially electrodepositing a first material and said at least two target materials into said open pores, to thereby obtain within said pores nanometric rods, each of said nanometric rods having a plurality of segments wherein any two adjacent segments are made of different materials; and etching said membrane and said first material, thereby obtaining the nanostructures.

2. The process of claim 1, further comprising, subsequent to said sequentially electrodepositing said first material and said at least two target materials, removing said blocking layer.

3. The process of claim 1, wherein said electrodepositing said at least two target materials is independently effected by a method selected from the group consisting of a galvanostatic electrochemical deposition, a potentiostatic electrochemical deposition, a pulsed-current electrochemical deposition, and a cyclic-voltammetry electrochemical deposition.

4. The process of claim 1, wherein an average size of the nanostructures is manipulated by at least one of: said pore diameter of said membrane, a duration of each of said electrodepositing said at least two target materials, a method by which each of said electrodepositing is effected and a current at which said electrodepositing is effected.

5. The process of claim 1, wherein said at least two target materials comprise a plurality of target materials, and said nanostructures are multi-segmented nanostructures.

6. A nanostructure, comprising: a base surface and a top surface, the nanostructure being composed at least of three different segments of a target material arranged layerwise across a thickness direction thereof such that said layers are exposed at a periphery of said nanostructure between said base surface and said top surface, at least one of said segments being a target material which is an electropolymerized polymer or a semiconductor material selected from the group consisting of CdTe, CdS, CdSe, ZnS, ZnO, GaAs, ZnTe, CdTeSe, GaAs, gallium phosphide, gallium nitride, $TiO_2$, and $TiS_2$, the nanostructure having a diameter of less than 200 nm, an aspect ratio of less than 2 and a thickness of less than 100 nm, wherein the nanostructure comprises a polyaniline segment and a polypyrrole segment.

7. The nanostructure of claim 6, being generally shaped as a disk.

8. The nanostructure of claim 6, wherein at least one of said segments is made of a material selected from the group consisting of a metal, a semiconductor material and an electropolymerized organic polymer.

9. The nanostructure of claim 6, comprising a gold segment and a segment selected from a polypyrrole segment and a CdTe segment.

10. The nanostructure of claim 6, having an aspect ratio of less than 1.

11. A contrast agent comprising the nanostructure of claim 6.

12. A chemical sensor comprising the nanostructures of claim 6.

13. A method of modifying viscosity of a liquid, comprising introducing the nanostructures of claim 6 to the liquid thereby modifying the viscosity of the liquid.

14. A device, comprising the nanostructures of claim 6, wherein said device is selected from the group consisting of a solid state device, a field emission device, electron emission lithography apparatus, and a heat transfer device.

15. A liquid crystal composition, comprising the nanostructures of claim 6.

16. A reinforced material, comprising the material having the nanostructures of claim 6, incorporated therein.

17. A composition for contrast enhancement in MRI, the composition comprising the nanostructures according to claim 6 and a physiologically acceptable medium.

18. The nanostructure of claim 6, being prepared by:
depositing a blocking layer onto a first side of a porous membrane having pores of nanometric diameter, so as to substantially block said pores from said first side while leaving said pores open from a second side of said membrane;
sequentially electrodepositing a first material, said electropolymerized polymer or said semiconductor material, and at least one additional target material into said open pores, to thereby obtain within said pores nanometric rods, each of said nanometric rods having a plurality of segments wherein any two adjacent segments are made of different materials; and
etching said membrane and said first material.

19. A nanometric rod comprising at least three non-adjacent segments of a sacrificial material and a plurality of segments of at least one target material arranged lengthwise along the rod, wherein at least one of said segments of said at least one target material has a diameter of less than 200 nm, an aspect ratio of less than 2 and a length of less than 100 nm, the nanometric rod having a polyaniline segment and a polypyrrole segment.

20. The nanometric rod of claim 19, comprising a plurality of non-adjacent segments of a target material.

21. The nanometric rod of claim 19, comprising a plurality of adjacent segments of at least two target materials.

22. The nanometric rod of claim 19, wherein said at least one target material is selected from the group consisting of a metal, a semiconductor material and an electropolymerized polyer.

23. The nanometric rod of claim 19, further comprising a blocking layer onto which said plurality of segments are deposited.

24. The nanometric rod of claim 19, wherein said segments of said sacrificial material and said segments of said at least one target material are exposed at a periphery of the nanometric rod.

* * * * *